US009524750B2

(12) United States Patent
Mori

(10) Patent No.: US 9,524,750 B2
(45) Date of Patent: Dec. 20, 2016

(54) FASTENING AIDS, METHOD OF FASTENING REEL, AND REEL ASSEMBLY

(71) Applicant: FUJIFILM CORPORATION, Minato-ku, Tokyo (JP)

(72) Inventor: Yasuhiro Mori, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 507 days.

(21) Appl. No.: 13/948,180

(22) Filed: Jul. 23, 2013

(65) Prior Publication Data
US 2013/0306778 A1 Nov. 21, 2013

Related U.S. Application Data

(63) Continuation of application No. PCT/JP2012/054317, filed on Feb. 22, 2012.

(30) Foreign Application Priority Data

Mar. 3, 2011 (JP) ................. 2011-046698

(51) Int. Cl.
| | | |
|---|---|---|
| *G11B 15/32* | (2006.01) | |
| *G11B 23/087* | (2006.01) | |
| *G11B 23/037* | (2006.01) | |

(52) U.S. Cl.
CPC ....... *G11B 23/08757* (2013.01); *G11B 23/037* (2013.01); *G11B 23/08721* (2013.01)

(58) Field of Classification Search
CPC ............. G11B 23/08757; G11B 23/037; G11B 23/08721; G11B 23/107

(Continued)

(56) References Cited

U.S. PATENT DOCUMENTS 2,845,232 A * 7/1958 Paschkis ................ G01D 15/28
                                                              242/415.1
3,000,582 A * 9/1961 Brede .................. G11B 15/662
                                                              242/571.8

(Continued)

FOREIGN PATENT DOCUMENTS

JP 2002-036132 2/2002
JP 2004-338043 A 12/2004

(Continued)

OTHER PUBLICATIONS

Written Opinion of the ISA issued in International Application No. PCT/JP2012/054317 on May 22, 2012.

(Continued)

*Primary Examiner* — William A Rivera
(74) *Attorney, Agent, or Firm* — Solaris Intellectual Property Group, PLLC

(57) ABSTRACT

There is provided a fastening aid to be used in the case of incorporating a reel, equipped with a reel hub having recording tape wound around its outer peripheral surface, into a drive device and using screws to fasten the reel hub to a rotating member of the drive device, the fastening aid including: a main body portion; guide tube portions that are disposed projecting from a lower surface of the main body portion in such a way as to be coaxial with plural guide hole portions formed in the main body portion and to guide the screws to screw hole portions formed in the reel hub; and fitting portions that are formed on lower end portions of the guide tube portions and are fitted together with fitting counterpart portions formed around the screw hole portions on an upper surface side of the reel hub.

2 Claims, 26 Drawing Sheets

(58) Field of Classification Search
USPC ........ 242/611, 611.1, 612, 599.3, 599.4, 349
See application file for complete search history.

(56) References Cited

U.S. PATENT DOCUMENTS

| | | | | |
|---|---|---|---|---|
| 3,561,699 A * | 2/1971 | Garrett | ................... | G11B 15/22 242/355 |
| 5,992,791 A * | 11/1999 | Tsuda | ..................... | H02G 11/02 242/535.3 |
| 6,062,500 A * | 5/2000 | Coles | ................. | G11B 23/0312 242/332.8 |
| 6,379,098 B1 * | 4/2002 | Shibasaki | ............ | H05K 13/021 156/750 |
| 6,422,502 B1 * | 7/2002 | Takada | ................... | B65H 18/12 242/543 |
| 6,913,218 B2 * | 7/2005 | Ishihara | ................. | G03B 23/02 242/343 |
| 7,549,602 B2 * | 6/2009 | Inugai | ................... | B65H 75/14 242/348 |
| 9,087,550 B2 * | 7/2015 | Vanderheyden | ..... | G11B 23/037 |

FOREIGN PATENT DOCUMENTS

| | | |
|---|---|---|
| JP | 2007-073184 | 3/2007 |
| JP | 2007-226895 A | 9/2007 |
| JP | 2010-79989 A | 4/2010 |

OTHER PUBLICATIONS

International Search Report issued in International Application No. PCT/JP2012/054317 on May 22, 2012.
Japanese Office Action dated Feb. 4, 2014 for the corresponding Japanese Patent Application No. 2011-046698, with partial English Translation.
Partial English language translation of the following: Office action dated Apr. 15, 2014 from the Japanese Patent Office in a Japanese patent application corresponding to the instant patent application. This office action translation is submitted now in order to supplement the understanding of patent document JP2002-036132 and JP2007-073184 which are cited in the office action and are being disclosed in the instant Information Disclosure Statement.

* cited by examiner

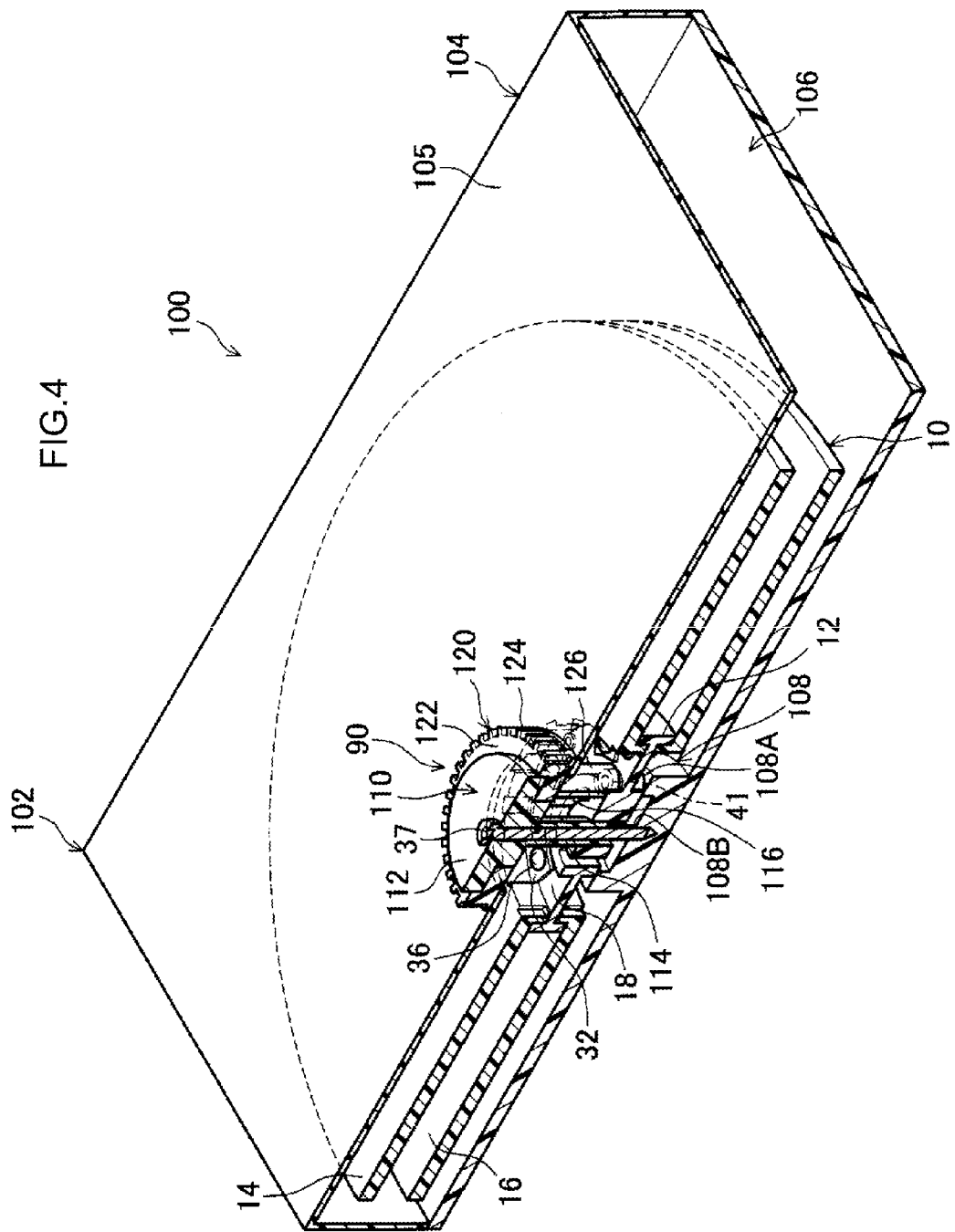

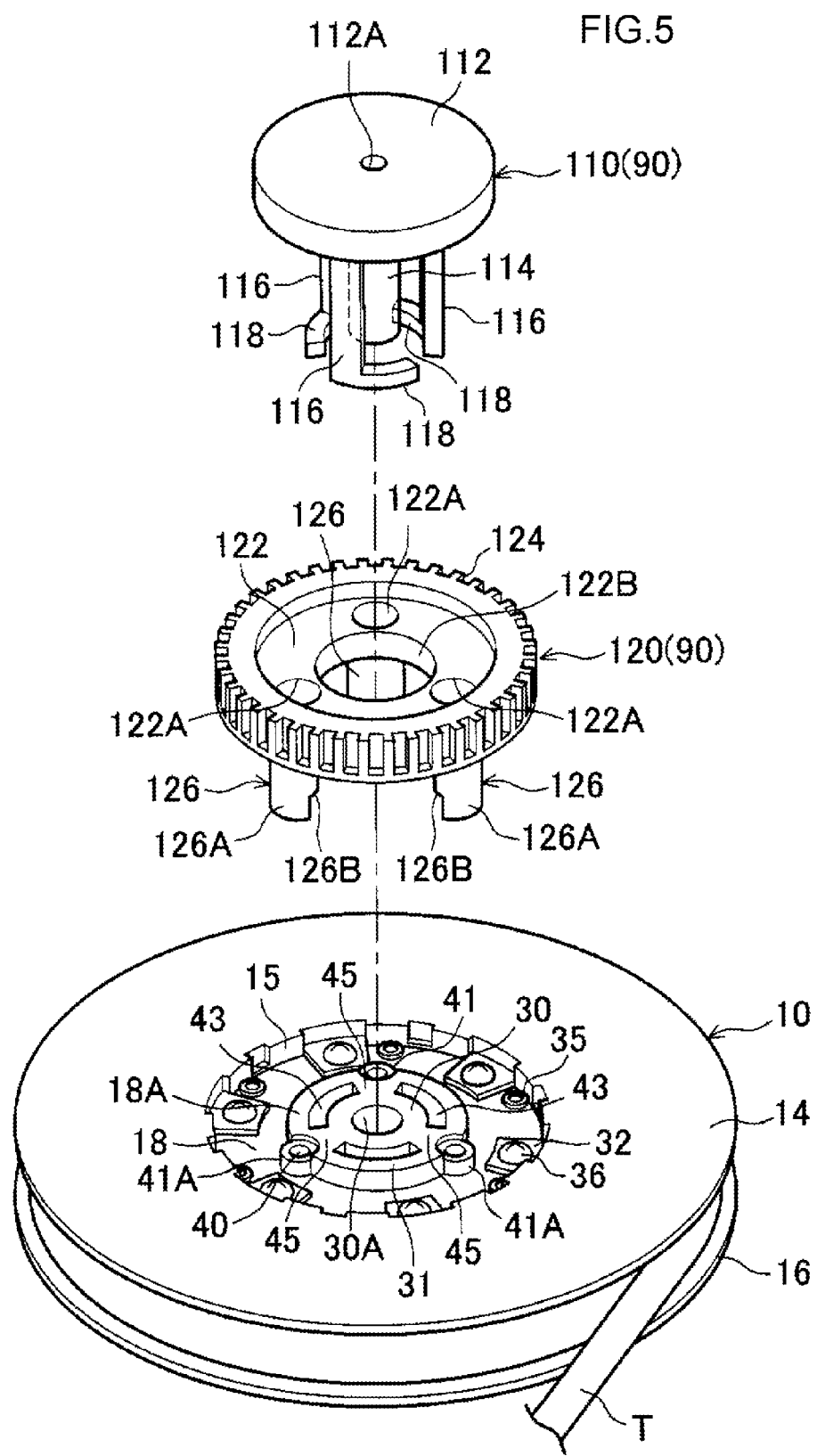

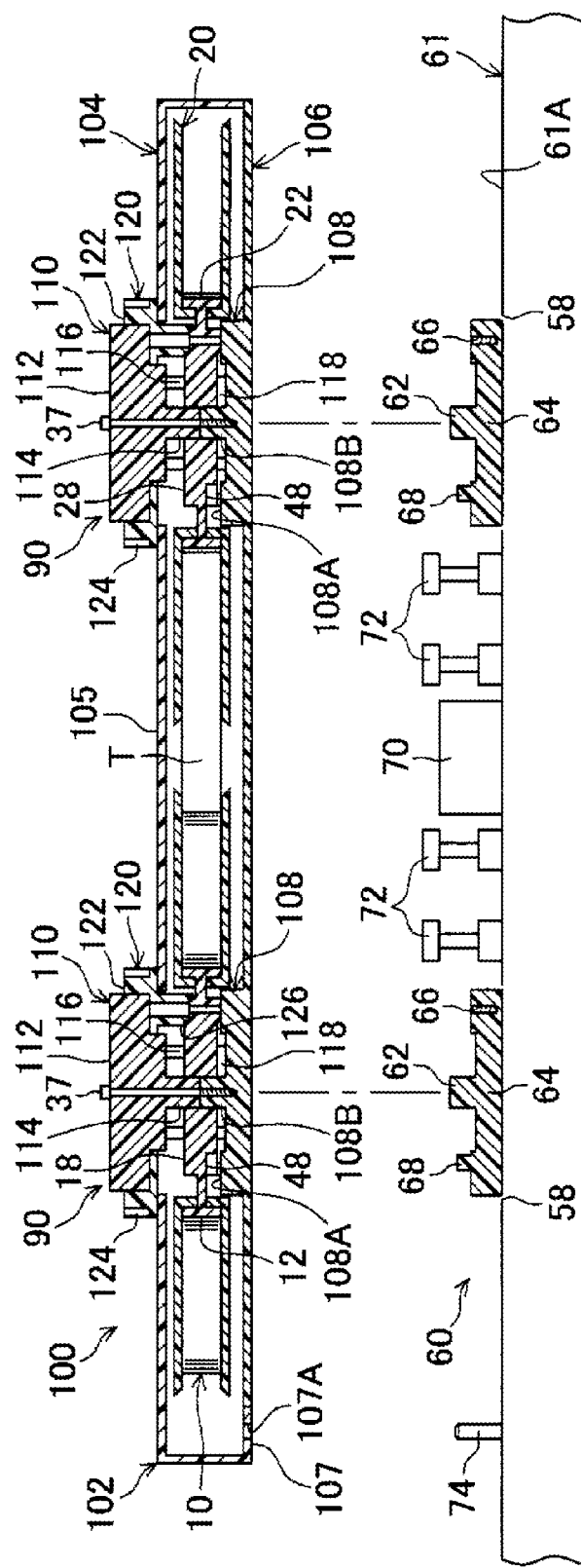

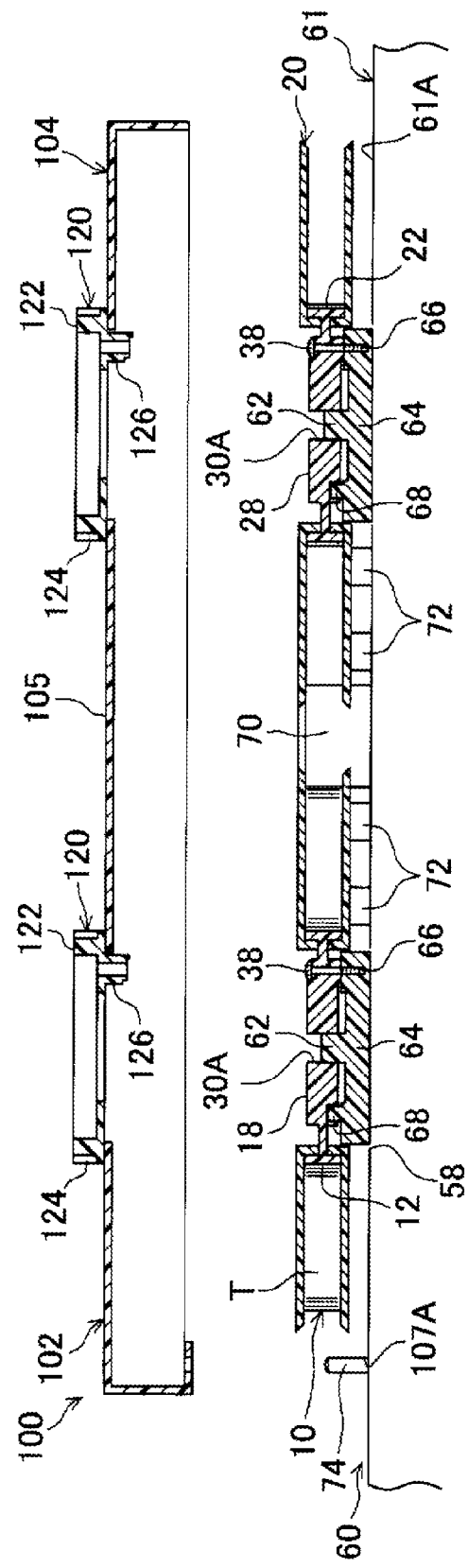

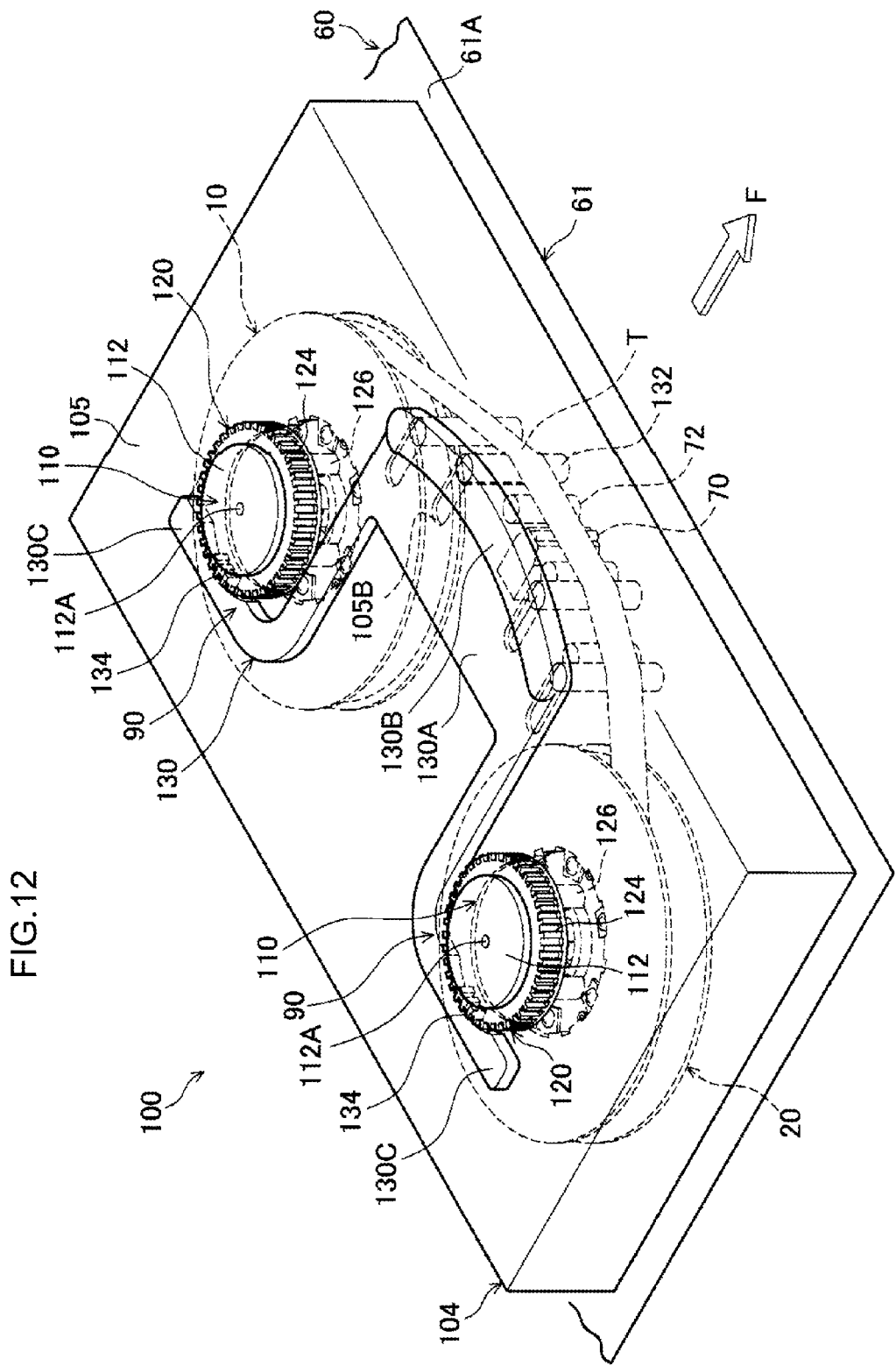

FASTENING AIDS, METHOD OF FASTENING REEL, AND REEL ASSEMBLY

CROSS-REFERENCE TO RELATED APPLICATIONS

This application is a continuation application of International Application No. PCT/JP2012/054317, filed Feb. 22, 2012, the disclosure of which is incorporated herein by reference in its entirety. Further, this application claims priority from Japanese Patent Application No. 2011-046698, filed Mar. 3, 2011, the disclosure of which is incorporated herein by reference in its entirety.

BACKGROUND

Technical Field

The present invention relates to a fastening aid to be used in the case of incorporating a reel into a drive device, a method of fastening the reel, and a reel assembly equipped with the fastening aid.

Related Art

Conventionally, there have been known recording tape cartridges where recording tape such as magnetic tape mainly used as an information recording and playback medium (data backup) for computers and so forth is wound around a reel and the reel is singly housed inside a case (e.g., see JP-A No. 2010-79989).

In a case in which the recording tape cartridge is loaded into a drive device, the recording tape is pulled out from the reel and is taken up on a take-up reel of the drive device. Then, information is written on or read from the recording tape by a recording and playback head of the drive device.

SUMMARY

However, in this system, a security measure becomes necessary with respect to the recording tape cartridge (the information recorded on the recording tape) because the recording tape cartridge is removable from the drive device. For this reason, disposing the reel directly inside the drive device and ensuring that the reel cannot be taken out has been considered, but in this case it is necessary to ensure the incorporability of the reel into the drive device.

And so in view of the above circumstances, the present invention obtains a fastening aid that can ensure the incorporability, into a drive device, of a reel to be incorporated into the drive device, a method of fastening the reel, and a reel assembly.

A first aspect of the present invention provides a fastening aid to be used in the case of incorporating a reel, equipped with a reel hub having recording tape wound around its outer peripheral surface, into a drive device and using screws to fasten the reel hub to a rotating member of the drive device, the fastening aid including: a main body portion; guide tube portions that are disposed projecting from a lower surface of the main body portion in such a way as to be coaxial with plural guide hole portions formed in the main body portion and to guide the screws to screw hole portions formed in the reel hub; and fitting portions that are formed on lower end portions of the guide tube portions and are fitted together with fitting counterpart portions formed around the screw hole portions on an upper surface side of the reel hub.

According to the fastening aid of the first aspect, the guide hole portions and the screw hole portions can be aligned by causing the fitting portions of the guide tube portions to fit together with the fitting counterpart portions formed around the screw hole portions of the reel hub. Consequently, the screws can be guided to the screw hole portions of the reel hub by the guide tube portions. Because of this, the incorporability, into the drive device, of the reel to be incorporated into the drive device can be ensured.

Further, a second aspect of the present invention provides the fastening aid according to the first aspect, wherein catch portions that are inserted through through holes formed in the reel hub and catch on a lower surface of the reel hub are formed on the main body portion.

According to the second aspect, the reel can be supported by the fastening aid. That is, the reel can be conveyed to the drive device by gripping the fastening aid. Consequently, the incorporability, into the drive device, of the reel to be incorporated into the drive device can be ensured.

Further, a third aspect of the present invention provides a reel fastening method of incorporating a reel, equipped with a reel hub having recording tape wound around its outer peripheral surface, into a drive device and, using the fastening aid according to the first aspect, using screws to fasten the reel hub to a rotating member of the drive device, the reel fastening method including: causing the fitting portions of the guide tube portions to fit together with the fitting counterpart portions formed around the screw hole portions on the upper surface side of the reel hub; inserting the screws into the guide hole portions of the main body portion and passing the screws through the plural guide tube portions to thereby supply the screws to the screw hole portions of the reel hub and screw boss portions formed on the rotating member; using a tool inserted from the guide hole portions of the main body portion to screw the screws supplied to the screw boss portions into the screw boss portions; and removing the fastening aid from the reel hub after having screwed the screws into the screw boss portions.

According to the third aspect of the present invention, the guide hole portions and the screw hole portions can be aligned by causing the fitting portions of the guide tube portions to fit together with the fitting counterpart portions formed around the screw hole portions of the reel hub. Consequently, the screws can be guided to the screw hole portions of the reel hub and the screw boss portions of the rotating member by the guide tube portions. Because of this, the incorporability, into the drive device, of the reel to be incorporated into the drive device can be ensured.

Further, a fourth aspect of the present invention provides a reel assembly including: a reel configured such that one of either plural convex portions or plural concave portions are formed on an upper surface side of a rotating member of a drive device and fit together with the other of either the plural convex portions or the plural concave portions, the other being formed on a lower surface side of the reel hub, wherein, by causing the plural convex portions and the plural concave portions to fit together, screw hole portions of the reel hub are aligned with screw boss portions of the rotating member; and the fastening aid according to the first aspect, which rotatably holds the reel as a result of the fitting portions being caused to fit together with the fitting counterpart portions.

According to the fourth aspect of the present invention, the reel is rotatably held by the fastening aid as a result of the fitting portions of the guide tube portions being caused to fit together with the fitting counterpart portions formed around the screw hole portions of the reel hub. Consequently, the convex portions and the concave portions can be caused to fit together by using the fastening aid to adjust the circumferential direction position of the reel. Further, in accompaniment with this, the guide hole portions, the screw hole portions, and the screw boss portions become aligned, so the screws can be guided to the screw hole portions of the reel hub and the screw boss portions of the rotating member by the guide tube portions. Because of this, the incorporability, into the drive device, of the reel to be incorporated into the drive device can be ensured.

As described above, according to the aspects of the present invention, there can be provided a fastening aid that can ensure the incorporability, into a drive device, of a reel to be incorporated into the drive device, a method of fastening the reel, and a reel assembly.

BRIEF DESCRIPTION OF THE DRAWINGS

FIG. 4 is a perspective cross-sectional view showing an up-and-down position defining member and a rotational position defining member of the magazine.

FIG. 5 is an enlarged exploded perspective view showing the up-and-down position defining member and the rotational position defining member of the magazine.

FIG. 10A is an explanatory drawing showing a step of removing a lower cartridge of the magazine and incorporating the magazine into the drive device.

FIG. 11B is an explanatory drawing showing the step of incorporating the magazine into the drive device until removing the upper cartridge.

FIG. 12 is a perspective view showing the magazine in a state in which the lower cartridge has been removed and the magazine has been incorporated into the drive device.

DETAILED DESCRIPTION

An embodiment pertaining to the present invention will be described in detail below on the basis of the drawings. For convenience of description, arrow UP in FIG. 1 denotes an up direction, arrow DO denotes a down direction, and a rotation axis direction of reels 10 and 20 pertaining to the present embodiment is in the up-and-down direction (height direction).

Figure 1:
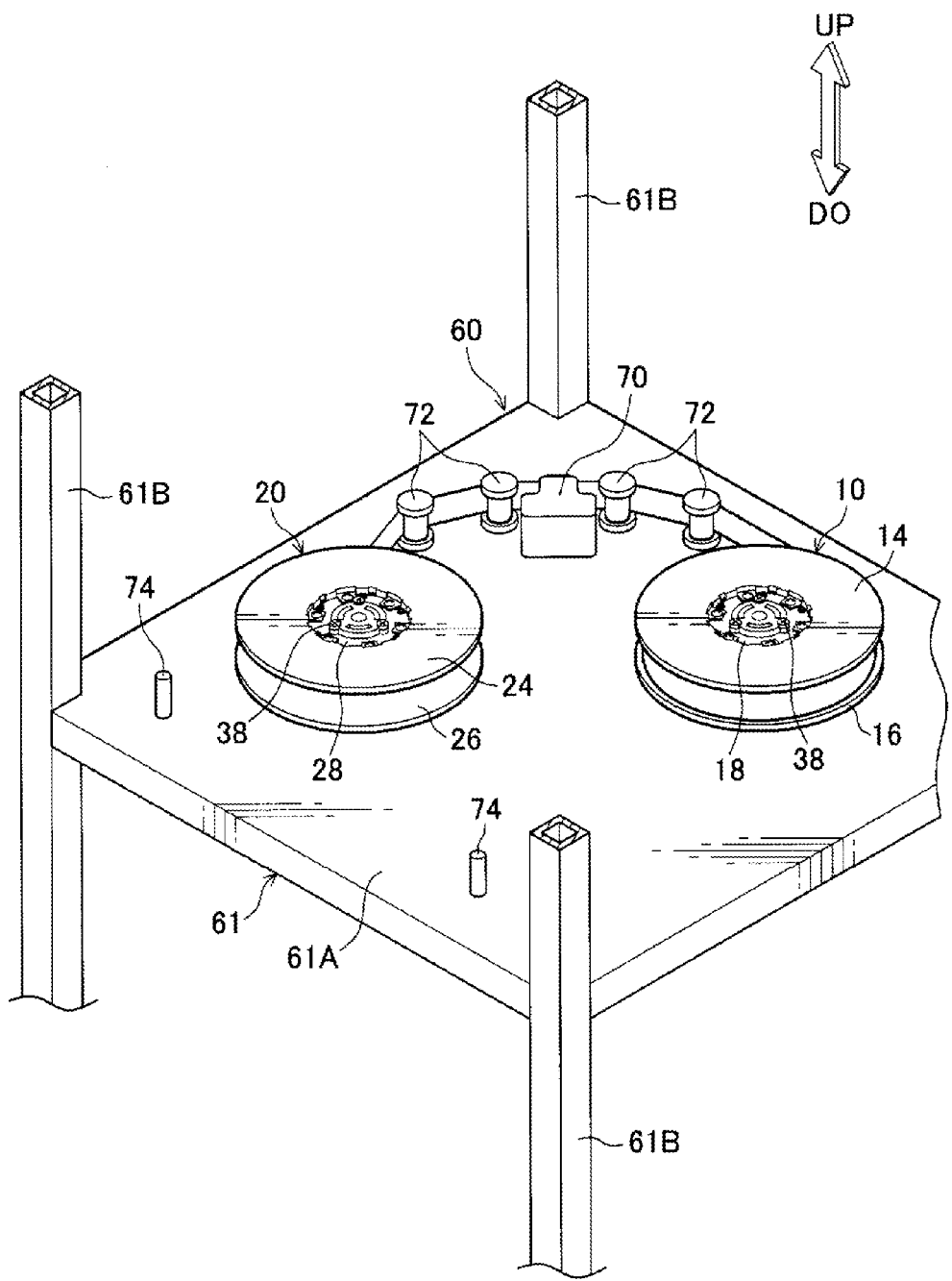
FIG. 1 is a perspective view showing a drive device into which reels have been incorporated.

The reels 10 and 20 pertaining to the present embodiment are made of a synthetic resin such as polycarbonate (PC), for example, and, as shown in FIG. 1, are disposed as a pair inside a casing 61 of a drive device 60 (in FIG. 1, only a bottom panel 61A and three support posts 61B are shown).

That is, the reel 10 is for paying out later-described recording tape T, the reel 20 is for taking up the later-described recording tape T, and the recording tape T paid out from the reel 10 slides on and contacts a recording and playback head 70 while being taken up on the reel 20. That is, data is recorded on the recording tape T and data recorded on the recording tape T is played back by the recording and playback head 70.

Plural (two each are shown in the drawings for a total of four) tape guides (main guides) 72 are disposed in such a way that they may freely rotate on the bottom panel 61A on both sides of the recording and playback head 70, and the recording tape T pulled out from the reel 10 and taken up on the reel 20 is guided by the tape guides 72.

Figure 2:
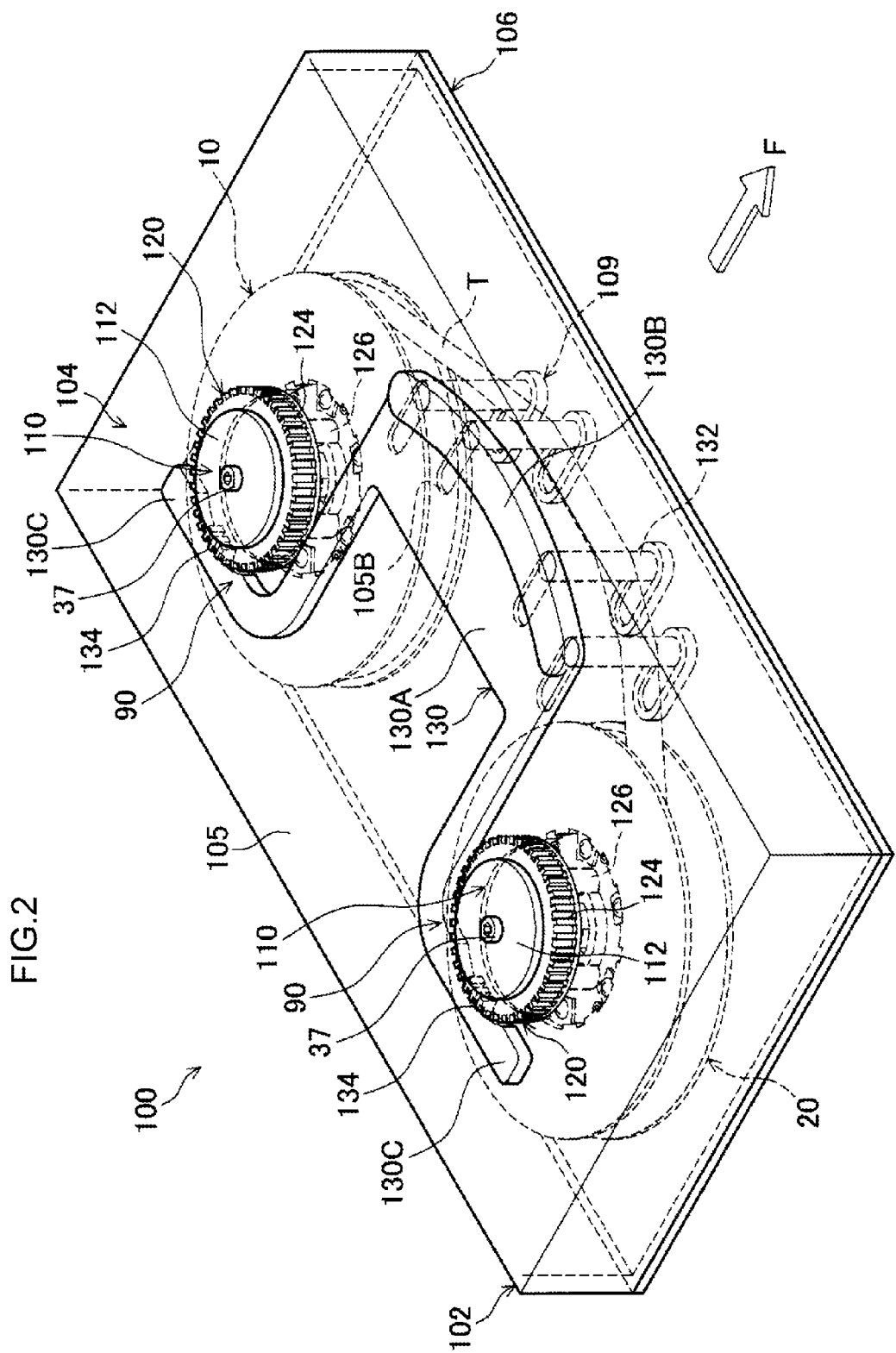
FIG. 2 is a perspective view in a case where a magazine is seen from above.
Figure 3:
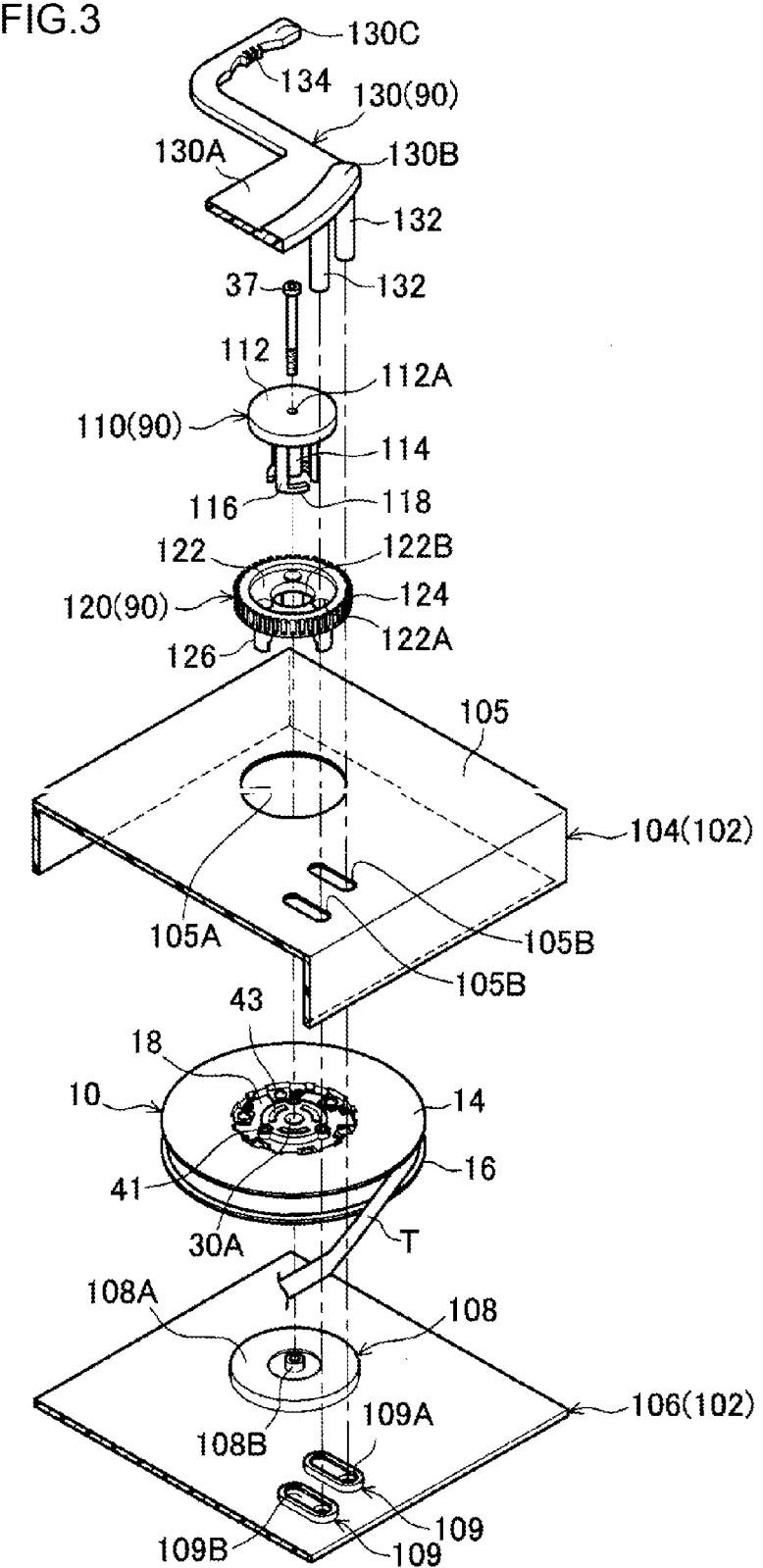
FIG. 3 is an exploded perspective view showing part of the magazine.

Here, a magazine 100 for incorporating the pair of reels 10 and 20 into the drive device 60 will be described. As shown in FIG. 2 and FIG. 3, the magazine 100 has a cartridge 102 having a substantially rectangular box-like upper cartridge 104 whose underside is open (whose side wall is integrally disposed upright on a peripheral edge portion of a top wall 105) and a tabular lower cartridge 106 that is capable of closing off the open underside of the upper cartridge 104.

The material of the upper cartridge 104 and the lower cartridge 106 is not particularly limited. For example, the upper cartridge 104 and the lower cartridge 106 may be molded using a metal material such as sheet metal or may be molded using a synthetic resin material such as the same PC as that of the reels 10 and 20. Further, an arbitrary configuration may be employed for the configuration by which the lower cartridge 106 is removably disposed on the upper cartridge 104.

For example, a configuration by which the lower cartridge 106 is made attachable to the upper cartridge 104 by forming groove portions (not shown in the drawings) in the lower end portion of the side wall of the upper cartridge 104 and sliding mutually facing border portions of the lower cartridge 106 into the groove portions may be employed. Additionally, the later-described pair of reels 10 and 20 are housed inside the cartridge 102 of the magazine 100 in a line in the longitudinal direction of the cartridge 102.

The magazine 100 is equipped with resin up-and-down position defining members 110 that define the up-and-down direction (height direction) positions of the reels 10 and 20 housed inside the cartridge 102, resin rotational position defining members 120 serving as fastening aids that define the circumferential direction (rotational direction) positions of the reels 10 and 20, and a resin lock member 130 that locks the rotation of the rotational position defining members 120 (the reels 10 and 20). Additionally, reel holding unit 90 that hold the reels 10 and 20 are configured by the up-and-down position defining members 110, the rotational position defining members 120, and the lock member 130.

As shown in FIG. 2 and FIG. 3, circular open portions 105A for allowing the rotational position defining members 120 and the up-and-down position defining members 110 to be inserted therethrough are formed for each of the reels 10 and 20 in the top wall 105 of the upper cartridge 104. Additionally, long hole portions 105B for allowing later-described plural (four are shown in the drawings) tape guides 132 of the lock member 130 to be inserted therethrough are formed in the top wall 105 of the upper cartridge 104 in a line in the longitudinal direction of the cartridge 102 in the same number (four are shown in the drawings) taking as their longitudinal direction the direction orthogonal to the direction in which the reels 10 and 20 are lined up (the longitudinal direction of the cartridge 102).

Figure 10B:
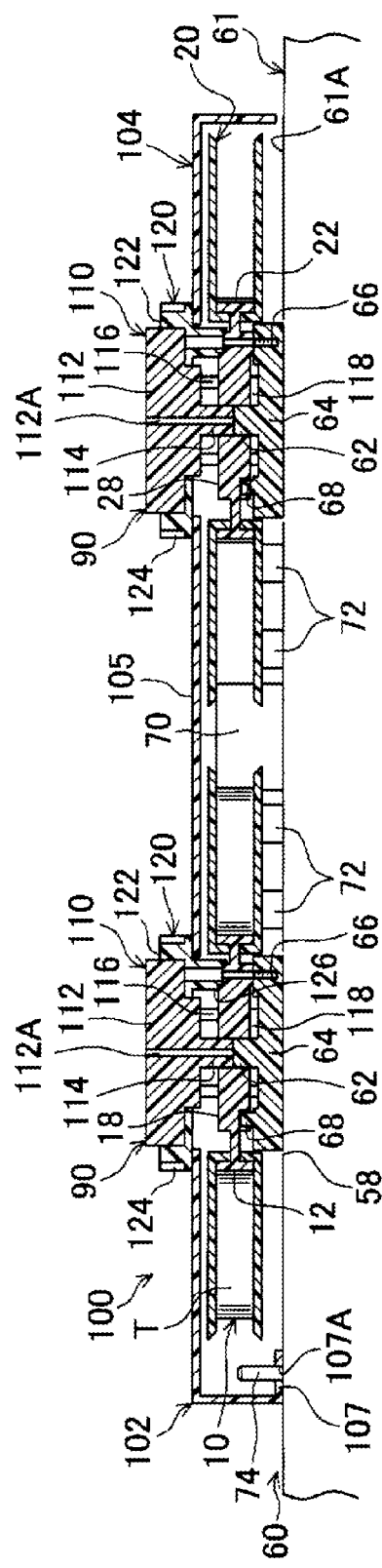
FIG. 10B is an explanatory drawing showing the step of removing the lower cartridge of the magazine and incorporating the magazine into the drive device.

As shown in FIG. 1 and FIGS. 10A and 10B, a bottom surface portion 107 having plural (e.g., two) reference holes (engaged portions) 107A for allowing plural (e.g., two) positioning pins (engaging portions) 74 of the drive device 60 to be inserted therethrough are formed in the upper cartridge 104 of the magazine 100, and a bottom wall of the cartridge 102 is configured by the lower surface portion 107 and the lower cartridge 106. Additionally, because of this, the position where the magazine 100 is disposed with respect to the drive device 60 is defined (positioned).

Further, as shown in FIG. 3, base portions 108, which have annular support bases 108A that support reinforcement portions 18 and 28 of the reels 10 and 20 from below and cylindrical screw boss portions 108B into which later-described fixing screws 37 are screwed in rotational center positions of the reels 10 and 20 inside the support bases 108A, are integrally formed on the lower cartridge 106 of the magazine 100.

Figure 8A:
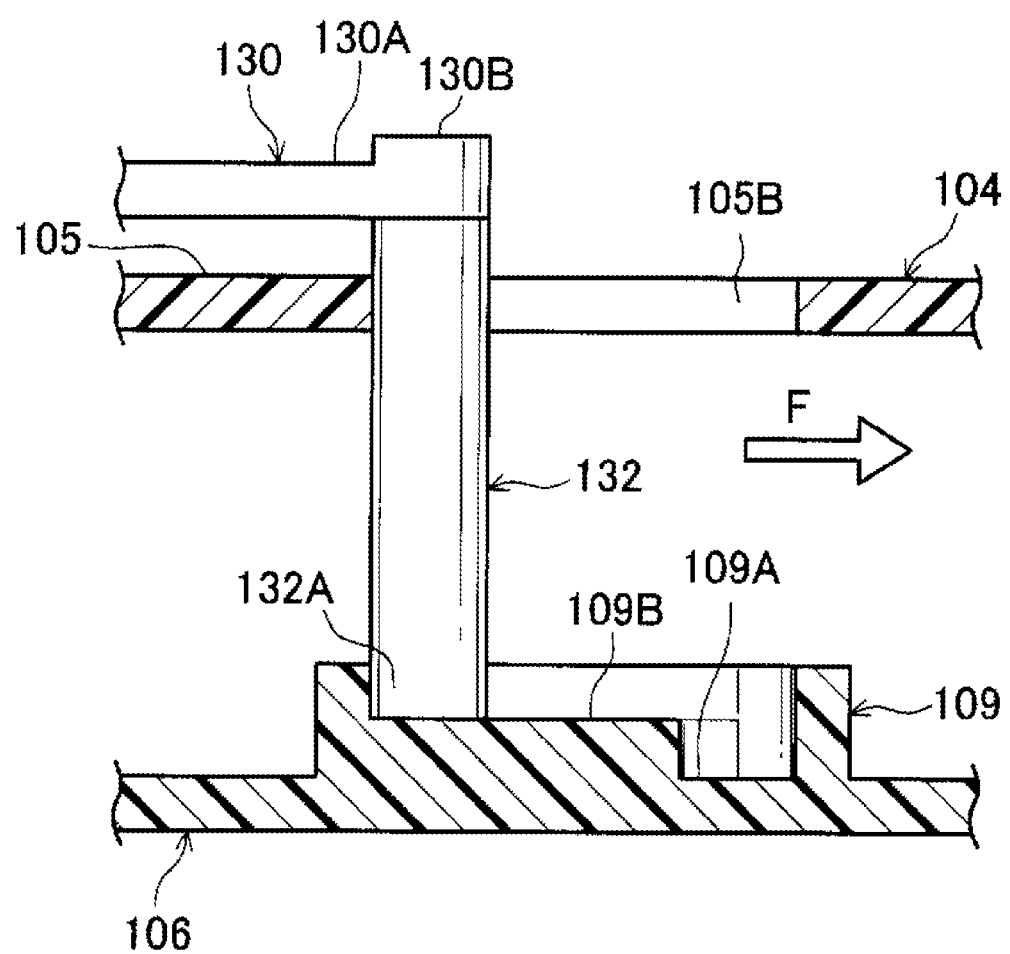
FIG. 8A is a cross-sectional view showing a lock hole that locks, and a guide groove that guides, a tape guide of a lock member.
Figure 8B:
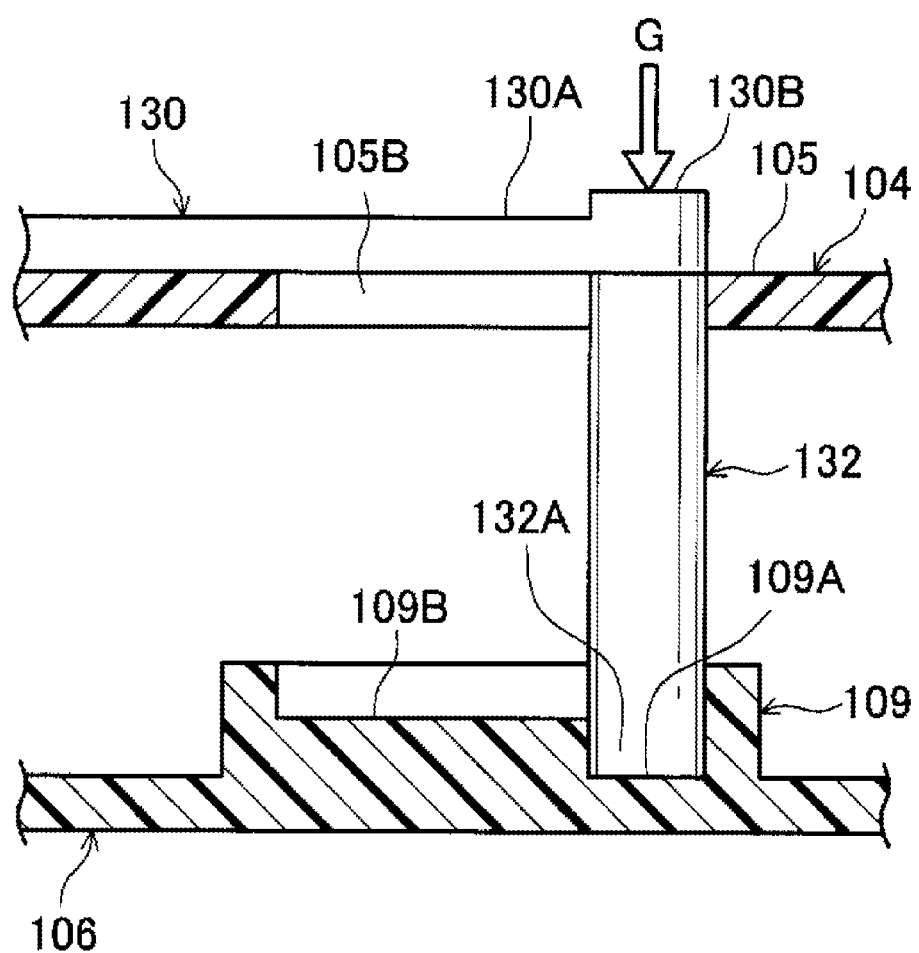
FIG. 8B is a cross-sectional view showing the lock hole that locks, and the guide groove that guides, the tape guide of the lock member.

Additionally, as shown in detail in FIGS. 8A and 8B, guide lock portions 109, which have circular lock holes 109A that have a slightly smaller diameter than the outer diameter of the tape guides 132 and immovably lock the lock member 130 as a result of lower end portions 132A of the tape guides 132 being press-fitted therein and substantially elliptical guide grooves 109B that have the same diameter as the diameter of the lock holes 109A and are formed continuously with the lock holes 109A and guide the lower end portions 132A of the tape guides 132 in a case in which the tape guides 132 move along the long hole portions 105B, are integrally formed on the lower cartridge 106.

Further, as shown in FIG. 4 and FIG. 5, the rotational position defining members 120 each have disc-shaped main body portions 122, whose outer diameter is larger than the diameter of the open portions 105A and which have engagement gears 124 formed across their entire outer peripheral portions, and cylindrical guide tube portions 126, which are disposed projecting from lower surfaces of the main body portions 122 in such a way as to be coaxial with guide hole portions 122A plurally (e.g., three) formed at equally-spaced intervals on a concentric circumference of the main body portion 122.

Extension portions 126A, which are shaped like semicircular arcs as seen in a bottom view and serve as fitting portions that fit together with outer peripheral surfaces (fitting counterpart portions) 41A of later-described boss portions 41 of the reinforcement portions 18 and 28, are formed on radial direction outer sides of lower end portions of the guide tube portions 126. That is, lower end surfaces 126B of the guide tube portions 126 on the radial direction inner sides of the extension portions 126A come into contact with upper surfaces of the boss portions 41, and the extension portions 126A cover the outer peripheral surfaces 41A of the boss portions 41. Additionally, through holes 122B for allowing the up-and-down position defining members 110 to be inserted therethrough are formed in center portions of the main body portions 122.

Further, as shown in FIG. 5, the up-and-down position defining members 110 each have disc-shaped main body portions 112 whose outer diameter is smaller than the diameter of the main body portions 122 of the rotational position defining members 120 (substantially the same diameter as the diameter of the open portions 105A), cylindrical boss portions 114 that are disposed projecting from lower surfaces of the main body portions 112 in such a way as to be coaxial with screw hole portions 112A formed in center positions of the main body portions 112, and catch portions 116 that are plurally (e.g., three) disposed projecting from the lower surfaces of the main body portions 112 at equally-spaced intervals on a concentric circumference of the main body portions 112.

Hook portions 118 that extend in a circumferential direction and in one direction are integrally formed on lower end portions of the catch portions 116. Additionally, the catch portions 116 equipped with the hook portions 118 and the boss portions 114 are inserted through the through holes 122B in the rotational position defining members 120 and are inserted through plural (in this case, three at equally-spaced intervals) circular arc-shaped long hole portions (through holes) 43 and hole portions 30A formed in the reinforcement portions 18 and 28.

Figure 6A:
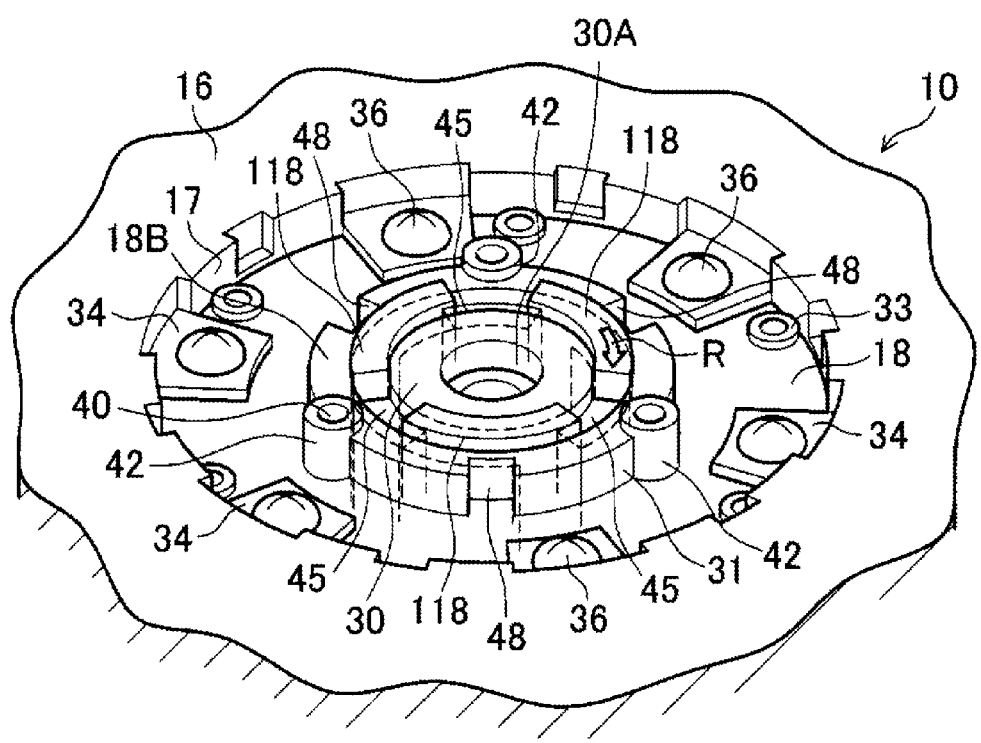
FIG. 6A is a perspective view showing an attachment structure of the up-and-down position defining member.
Figure 6B:
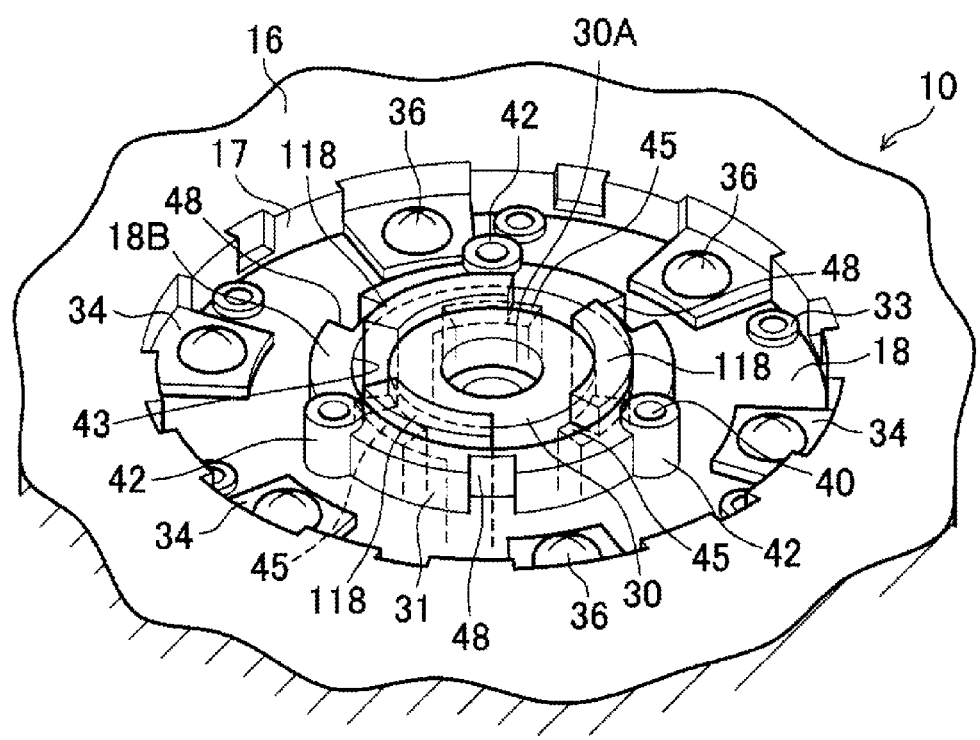
FIG. 6B is a perspective view showing the attachment structure of the up-and-down position defining member.

Here, as shown in FIGS. 6A and 6B, the hook portions 118 of the catch portions 116 inserted through the long hole portions 43 catch on lower surfaces of later-described coupling portions 45 as a result of the catch portions 116 being rotated in the one direction in which the hook portions 118 extend (the direction of arrow R shown in FIG. 6A) until the catch portions 116 come into contact with side surfaces of the coupling portions 45 facing the circumferential direction.

Because of this, as shown in FIG. 4, the up-and-down position defining members 110 are attached (fixed) to the reels 10 and 20 in a state in which the rotational position defining members 120 are sandwiched between the up-and-down position defining members 110 and the reinforcement portions 18 and 28 of the reels 10 and 20, and the reels 10 and 20 are held in a state in which they are suspended on the top wall 105 of the upper cartridge 104 by the rotational position defining members 120 equipped with the main body portions 122 that are larger in diameter than the open portions 105A.

Additionally, in this state, fixing screws 37 are inserted through the screw hole portions 112A formed in the center positions of the main body portions 112 of the up-and-down position defining members 110 and are screwed into the screw boss portions 108B in the base portions 108 of the lower cartridge 106, whereby the upper cartridge 104 and the lower cartridge 106 are joined together and the reels 10 and 20 are housed inside the cartridge 102 in a state in which the positions of the reels 10 and 20 in the up-and-down direction are defined.

That is, because of this, the reels 10 and 20 are not only positioned and held in the upper cartridge 104 by the up-and-down position defining members 110 and the rotational position defining members 120 but are also supported from below by the base portions 108 (the support bases 108A) of the lower cartridge 106, and inside the magazine 100 (the cartridge 102), upper flanges 14 and 24 of the reels 10 and 20 do not contact the inner surface of the top wall 105 of the upper cartridge 104 and lower flanges 16 and 26 of the reels 10 and 20 do not contact the inner surface of the lower cartridge 106.

Here, the reels 10 and 20 will be described mainly on the basis of FIG. 5 and FIGS. 6A and 6B. The pay-out reel 10 that is housed in the magazine 100 and is supplied from the magazine 100 to the drive device 60 is configured to include a substantially cylindrical reel hub 12 that configures an axial center portion of the reel 10, an annular upper flange 14 that is disposed on the upper end portion side of the reel hub 12, an annular lower flange 16 that is disposed on the lower end portion side of the reel hub 12, and the reinforcement portion 18 that is disposed consecutively and integrally with the height (axial) direction substantial center portion of the inner peripheral surface of the reel hub 12.

Similarly, the take-up reel 20 that is housed in the magazine 100 and is supplied from the magazine 100 to the drive device 60 is also configured to include a substantially cylindrical reel hub 22 that configures an axial center portion of the reel 20, an annular upper flange 24 that is disposed on the upper end portion side of the reel hub 22, an annular lower flange 26 that is disposed on the lower end portion side of the reel hub 22, and the reinforcement portion 28 that is disposed consecutively and integrally with the height (axial) direction substantial center portion of the inner peripheral surface of the reel hub 22.

Additionally, the recording tape T such as magnetic tape serving as an information recording and playback medium is wound around the outer peripheral surface of the reel hub 12 of the reel 10, and the width direction edges of the wound recording tape T are held by the upper flange 14 and the lower flange 16. And moreover, the recording tape T paid out from the reel 10 is wound around the outer peripheral surface of the reel hub 22 of the reel 20, and the width direction edges of the recording tape T are held by the upper flange 24 and the lower flange 26.

"Substantially cylindrical" in the present embodiment also includes generally cylindrical reel hubs where the shape of the outer peripheral surfaces (winding surfaces) of the reel hubs 12 and 22 around which the recording tape T is wound is formed in the shape of a drum or the like and hollow reel hubs that are not completely cylindrical but have ribs or the like disposed projecting from the inner peripheral surface sides of the reel hubs 12 and 22.

Further, mainly the reel 10 will be described below because the reel 20 has the same configuration as that of the reel 10. As shown in FIG. 5 and FIGS. 6A and 6B, a cylinder portion 15 that extends a predetermined height downward is integrally formed on the inner peripheral edge portion of the upper flange 14, and a cylinder portion 17 that extends a predetermined height upward is integrally formed on the inner peripheral edge portion of the lower flange 16.

Tabular jutting portions 32 and 34 that project inward in the radial direction (toward the rotational center portion of the reel 10) are formed on the inner peripheral surface of the cylinder portion 15 and the inner peripheral surface of the cylinder portion 17 in pluralities (e.g., six each) at equally-spaced intervals in positions that do not coincide with one another as seen in a plan view, and circular hole portions (not shown in the drawings) are formed in the jutting portions 32 and 34.

Further, cylindrical screw boss portions 33 and 35 having female threads cut into their inner peripheral surfaces are disposed projecting from the lower surface and the upper surface on the outer peripheral edge portion side of the reinforcement portion 18 of the reel hub 12 (the inner peripheral surface side of the reel hub 12) in pluralities (e.g., six each) at equally-spaced intervals in positions that do not coincide with one another as seen in a plan view. Additionally, the screw boss portions 33 and 35 and the hole portions of the jutting portions 32 and 34 are in communication with one another.

Consequently, the upper flange 14 and the lower flange 16 are integrally attached to the reel hub 12 as a result of screws 36 inserted into the hole portions of the jutting portions 32 of the upper flange 14 from above being screwed into the screw boss portions 33 and screws 36 inserted into the hole portions of the jutting portions 34 of the lower flange 16 from below being screwed into the screw boss portions 35.

Further, a small cylinder portion 30 and a large cylinder portion 31 that is larger in diameter than the small cylinder portion 30 are disposed in the center portion of the reinforcement portion 18 on the radial direction inner side of the cylinder portion 15 and the cylinder portion 17, and the outer peripheral surface of the small cylinder portion 30 and the inner peripheral surface of the large cylinder portion 31 are configured to be integrally coupled together by coupling portions 45 disposed in three places at equally-spaced intervals.

Additionally, the upper surface of the large cylinder portion 31 serves as an annular upper surface portion 18A that projects upward to an extent that it does not project from the upper surface of the upper flange 14 as seen in a side view, and the lower surface of the large cylinder portion 30 serves as an annular lower surface portion 18B that projects downward to an extent that it does not project from the lower surface of the lower flange 16 as seen in a side view.

A later-described shaft portion 62 (see FIG. 7) of the drive device 60 is inserted (fitted) into the hole portion 30A of the small cylinder portion 30. Further, the small cylinder portion 30 and the large cylinder portion 31 are formed at the same height in the upper surface and the lower surface of the reinforcement portion 18, and the coupling portions 45 are formed at the same height as the small cylinder portion 30 and the large cylinder portion 31 on the upper surface side of the reinforcement portion 18.

That is, the coupling portions 45 are formed at a lower height than the small cylinder portion 30 and the large cylinder portion 31 on the lower surface side of the reinforcement portion 18 and are configured in such a way that the hook portions 118 that catch on the lower surfaces of the coupling portions 45 become substantially even with the annular lower surface portion 18B (such that the hook portions 118 relatively do not press against the support base 108A in a case in which the lower cartridge 106 has been joined to the upper cartridge 104).

Further, cylindrical projecting portions (boss portions) 42 that project further downward than the annular lower surface portion 18B as seen in a side view are formed in three places at equally-spaced intervals on the lower surface side of the reinforcement portion 18 and on the radial direction outer sides of the coupling portions 45, and cylindrical boss portions 41 that are lower in height than the annular upper surface portion 18A as seen in a side view are formed in three places at equally-spaced intervals on the upper surface side of the reinforcement portion 18 and on the radial direction outer sides of the coupling portions 45. Additionally, the boss portions 41 (projecting portions 42) configure screw hole portions 40 through which screws 38 (see FIGS. 11A and 11B and FIG. 14) for fixing the reinforcement portion 18 to a later-described rotating member 64 of the drive device 60 are inserted.

Further, on the upper surface side of the reinforcement portion 18, the height of the boss portions 41 is substantially the same as the height of the extension portions 126A (the height to which the extension portions 126A project from the lower end surfaces 126B), and the extension portions 126A fit together with the outer peripheral surfaces 41A of the boss portions 41 that jut further outward in the radial direction than the annular upper surface portion 18A, whereby the rotational position defining member 120 is stopped from turning with respect to the reinforcement portion 18 of the reel 10 and is integrally rotatable with the reel 10.

That is, the rotation of the rotational position defining member 120 is regulated by the lock member 130, whereby inadvertent rotation of the reel 10 is deterred. Additionally, the guide tube portions 126 of the rotational position defining members 120 serve as guide unit that guide the reel-fixing screws 38 to the boss portions 41 (the screw hole portions 40) of the reinforcement portions 18 and 28 and later-described screw boss portions 66 of rotating members 64 of the drive device 60 in the case of attaching the reinforcement portions 18 and 28 of the reels 10 and 20 to the rotating members 64.

Figure 7:
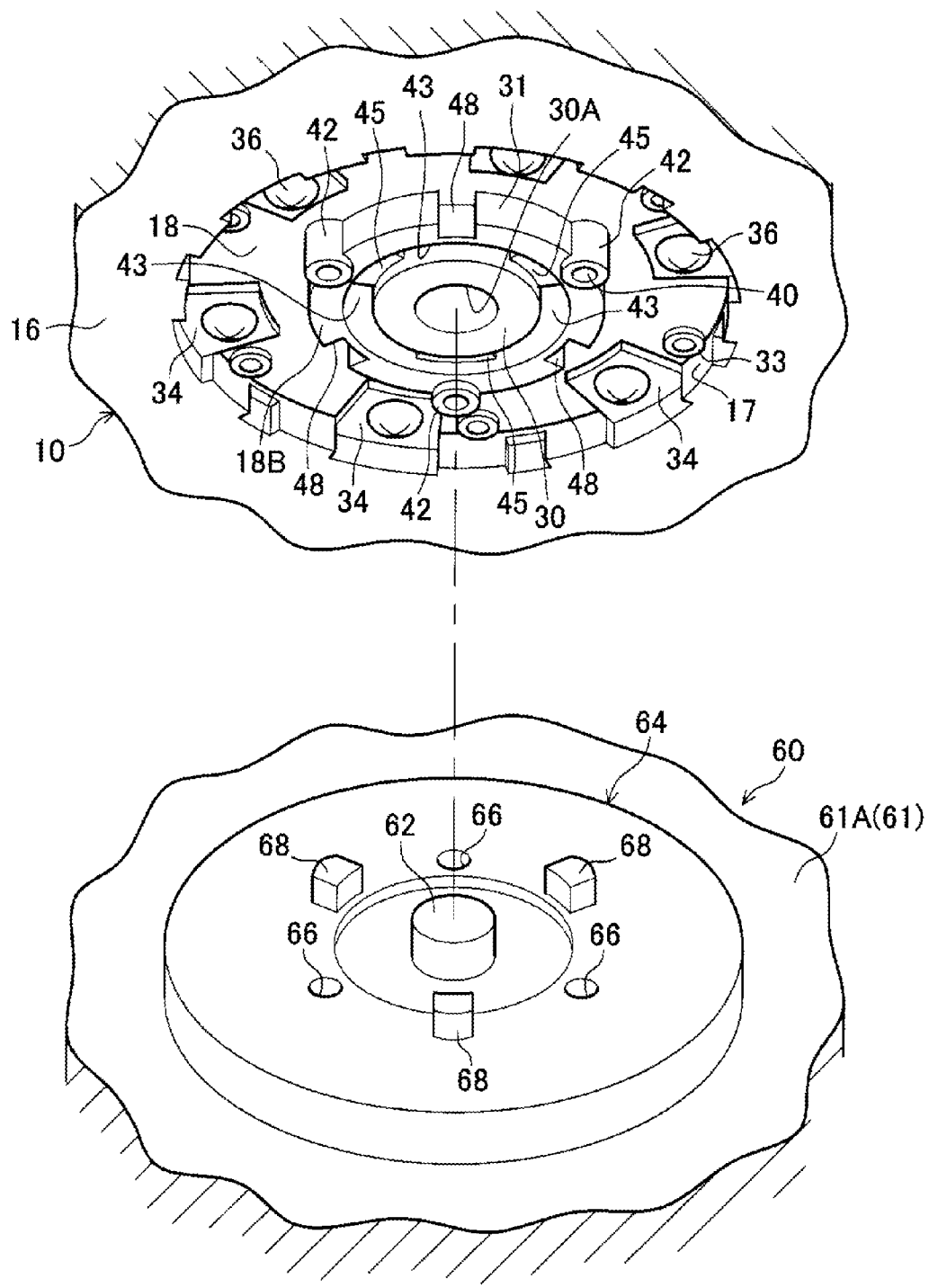
FIG. 7 is a perspective view showing a lower surface of a reinforcement portion of the reel that becomes fixed to a rotating member of the drive device.

Further, as shown in FIG. 7, concave portions 48 that fit together with convex portions 68 disposed projecting from the rotating member 64 of the drive device 60 are formed on the lower surface of the reinforcement portion 18 of the reel 10 between the projecting portions 42 (the screw hole portions 40) (i.e., three concave portions 48 are formed at equally-spaced intervals). The concave portions 48 are formed in such a way as to open outward in the radial direction.

A motor (not shown in the drawings) serving as a driving source is disposed in the drive device 60, and a pair of resin or metal rotating members 64 (see FIG. 7) to which rotational driving force is transmitted via transmission gears (not shown in the drawings) from rotating shafts (not shown in the drawings) of the motor are rotatably disposed inside a pair of open portions 58 (see FIGS. 10A and 10B and FIGS. 11 and 11B) formed in the casing 61 (the bottom panel 61A) of the drive device 60.

The reinforcement portions 18 and 28 of the reel hubs 12 and 22 of the reels 10 and 20 are fixed by the screws 38 to the rotating members 64. That is, three screw boss portions 66, into which the screws 38 inserted into the screw hole portions 40 of the reinforcement portions 18 and 28 are screwed, are formed at equally-spaced intervals on a concentric circumference of each rotating member 64.

Additionally, the three convex portions 68 that fit together with the concave portions 48 formed in the reinforcement portions 18 and 28 of the reel hubs 12 and 22 are disposed projecting at equally-spaced intervals in such a way as to be disposed midway between the screw boss portions 66 of each rotating member 64. And moreover, the cylindrical shaft portions 62 to be inserted into the hole portions 30A of the reinforcement portions 18 and 28 (the small cylinder portions 30) are disposed projecting upward in the center portions (rotational center portions) of each rotating member 64.

Consequently, the shaft portions 62 are inserted into the hole portions 30A in the case of fixing the reel 10 having the recording tape T wound around it and the reel 20 having the free end side of the recording tape T attached to the outer peripheral surface of the reel hub 22 to the rotating members 64 of the drive device 60. Additionally, in a case in which the convex portions 68 become fitted together with the concave portions 48, the positions of the screw hole portions 40 and the screw boss portions 66 become aligned, and after the screws 38 are inserted into the screw hole portions 40 from above and screwed into the screw boss portions 66, the reel hubs 12 and 22 and the rotating members 64 become integrally fixed.

Next, the lock member 130 will be described. As shown in FIG. 2, the lock member 130 is formed in the shape of a substantial "Ω" as seen in a plan view, and plural (four are shown in the drawings) cylindrical tape guides 132 serving as provisional guides are integrally disposed projecting in a line along the circular arc shape of the "Ω" from the lower surface of a distal end portion 130B of a center portion 130A formed in the circular arc shape of the "Ω". Additionally, as shown in detail in FIGS. 9A and 9B, lock gears 134 that mesh with the engagement gears 124 of the rotational position defining members 120 are formed on both end portions 130C of the lock member 130.

Here, the lock member 130 is attached to the outer surface of the top wall 105 of the upper cartridge 104 as a result of the tape guides 132 being inserted from outside through the plural long hole portions 105B formed in the top wall 105 of the upper cartridge 104. That is, the lock member 130 whose tape guides 132 have been inserted through the long hole portions 105B is slid in the direction of arrow F shown in FIG. 2 and FIG. 8A.

Figure 9A:
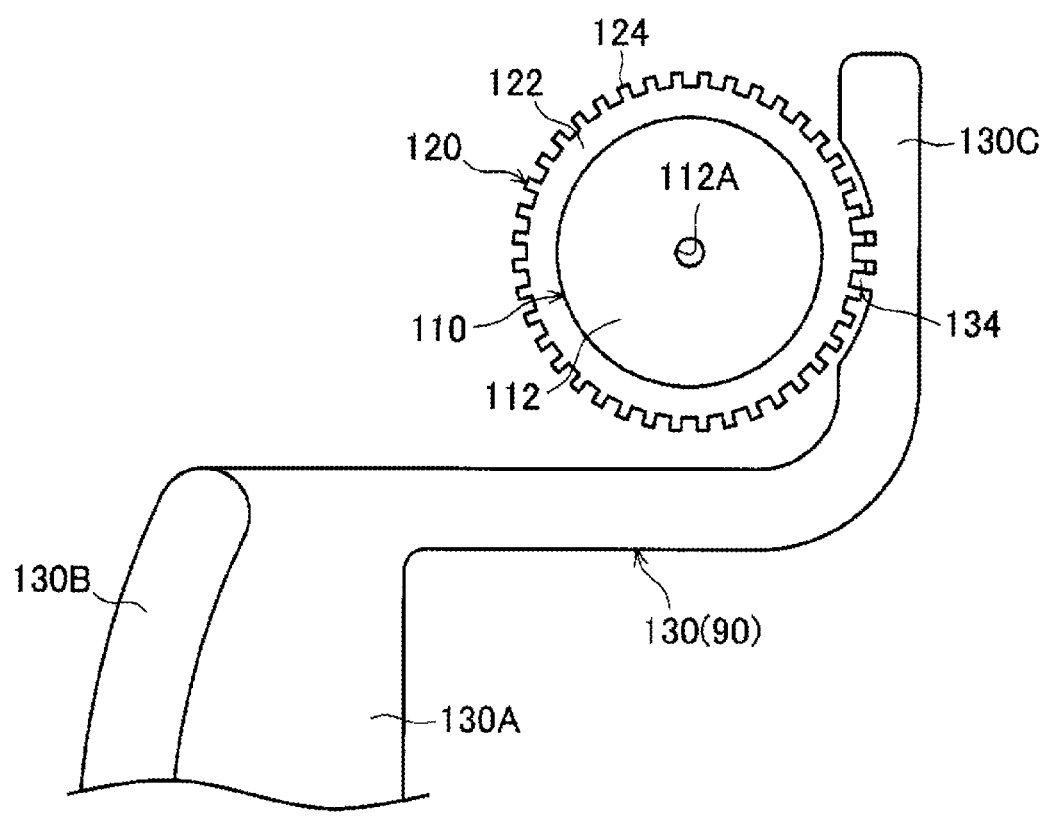
FIG. 9A is a plan view showing a meshing structure between a lock gear of the lock member and an engagement gear of the rotational position defining member.

Consequently, the lower end portions 132A of the tape guides 132 are guided in the direction of arrow F by the guide grooves 109B as shown in FIG. 8A, and when the lower end portions 132A come into contact with the distal end portions of the guide grooves 109B, the lock gears 134 mesh with the engagement gears 124 as shown in FIG. 9A. Additionally, as shown in FIG. 8B, the thick distal end portion 130B of the center portion 130A of the lock member 130 is pressed downward (in the direction of arrow G) from above to press-fit (fit) the lower end portions 132A of the tape guides 132 into the lock holes 109A.

Because of this, the lock member 130 is fixedly disposed on the top wall 105 of the upper cartridge 104, and inadvertent rotation of the reels 10 and 20 is deterred (locked) until the magazine 100 is incorporated into the drive device 60. Additionally, as shown in FIG. 2, the recording tape T paid out from the reel 10 and wound around the outer peripheral surface of the reel hub 22 of the reel 20 is held in a state in which a certain amount of tension is imparted thereto by the tape guides 132.

In the case of releasing the lock on the rotation resulting from the lock member 130 to incorporate the reels 10 and 20 inside the magazine 100 into the drive device 60, first, the distal end portion 130B of the lock member 130 is pulled upward to remove the lower end portions 132A of the tape guides 132 from the lock holes 109A. Then, the lock member 130 (the tape guides 132) is slid in the opposite direction (the direction of arrow E in FIG. 13) of the direction of arrow F shown in FIG. 2 and FIG. 8A along the long hole portions 105B to remove the lock gears 134 from the engagement gears 124.

Next, the method of incorporating the reels 10 and 20 into the drive device 60 in the case of using the magazine 100 (the method of fastening the reels 10 and 20 using the rotational position defining members 120) will be described. The reel 10 having the recording tape T wound around it and the reel 20 having the free end side of the recording tape T attached to the reel hub 22 are housed inside the cartridge 102 as a result of being held in the upper cartridge 104 by the reel holding unit 90 and the lower cartridge 106 being joined to the upper cartridge 104 by the fixing screws 37.

That is, the extension portions 126A of the guide tube portions 126 of the rotational position defining members 120 fit together with the outer peripheral surfaces 41A of the boss portions 41 of the reinforcement portions 18 and 28 of the reels 10 and 20 (a fitting step), the rotational position defining members 120 are fixed to the reels 10 and 20 by the up-and-down position defining members 110, and the rotation of the rotational position defining members 120 is locked by the lock member 130, whereby the reels 10 and 20 and held in such a way as to be non-rotatable.

Additionally, in this state, the upper flanges 14 and 24 and the lower flanges 16 and 26 are not in contact with the inner surfaces of the upper cartridge 104 and the lower cartridge 106. Consequently, even if the magazine 10 sustains an impact during transport of the magazine 100 or the like, deformation of particularly the upper flange 14 and the lower flange 16 of the reel 10 housed inside the magazine 100 is suppressed or prevented. Therefore, it is difficult for both width direction edges of the recording tape T wound around the reel 10 to become damaged.

In the case of incorporating the magazine 100 into the drive device 60, first, as shown in FIG. 10A and FIG. 10B, the lower cartridge 106 is removed. That is, the fixing screws 37 screwed into the center positions of the main body portions 112 of the up-and-down position defining members 110 are removed.

Then, the distal end portion 130B side of the lock member 130 is pulled upward to remove the lower end portions 132A of the tape guides 132 from the lock holes 109A. Because of this, the lower cartridge 106 is removed from the upper cartridge 104. The fixing screws 37 may also be removed after the lower end portions 132A of the tape guides 132 have been removed from the lock holes 109A.

Once the lower cartridge 106 has been removed from the upper cartridge 104, the upper cartridge 104 is moved onto the bottom panel 61A of the casing 61, and the positioning pins 74 disposed projecting on the bottom panel 61A are inserted through the reference holes 107A formed in the bottom surface portion 107 of the upper cartridge 104.

Because of this, the reels 10 and 20 are positioned with respect to the rotating members 64 of the drive device 60. That is, the reinforcement portions 18 and 28 of the reel hubs 12 and 22 of the reels 10 and 20 are positioned and disposed on the rotating members 64 of the drive device 60. FIG. 10B and FIG. 12 show this state.

At this time, the tape guides 132 of the lock member 130 do not interfere with the tape guides 72 because the tape guides 132 are disposed between the tape guides 72 of the drive device 60 and further on the side in the direction away from the recording and playback head 70 (the side in the direction of arrow F) than the tape guides 72 (see FIG. 12). Consequently, positioning and disposing the upper cartridge 104 holding the reels 10 and 20 on the bottom panel 61A of the casing 61 of the drive device 60 can be easily performed.

Figure 9B:
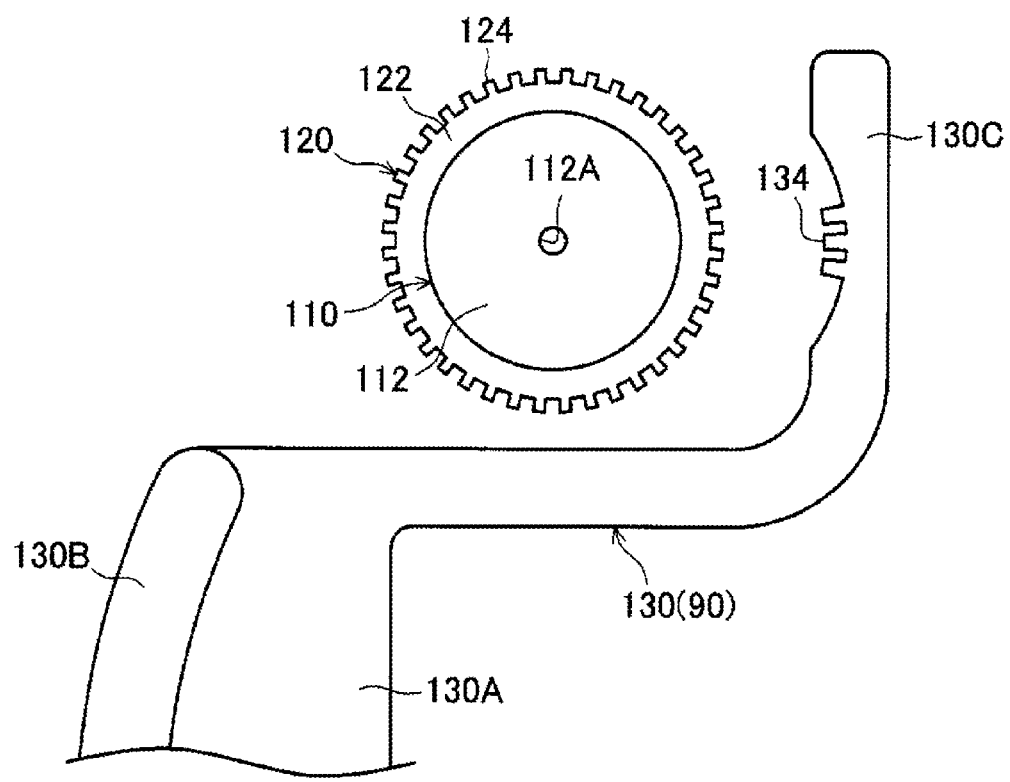
FIG. 9B is a plan view showing the meshing structure between the lock gear of the lock member and the engagement gear of the rotational position defining member.
Figure 13:
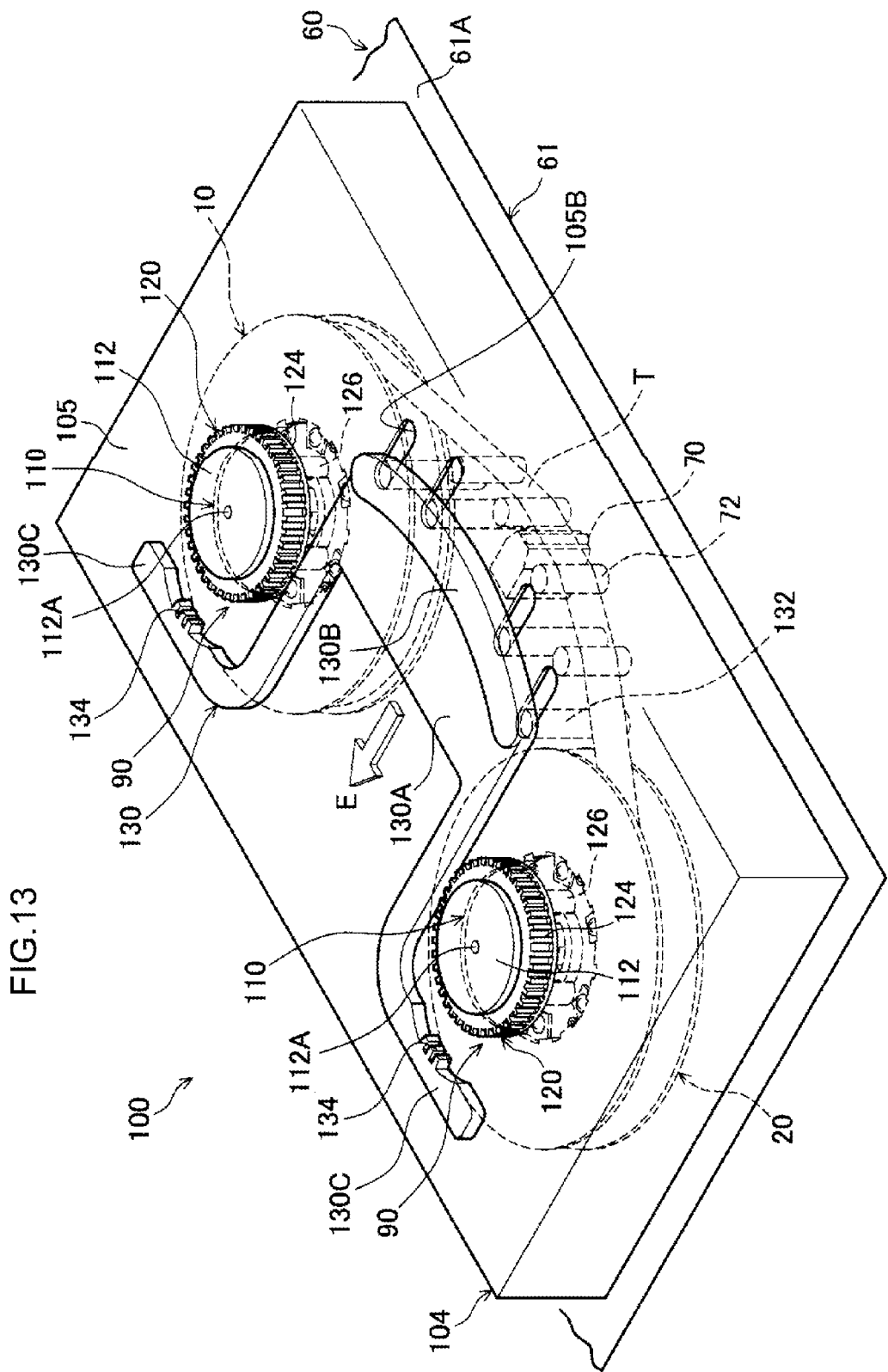
FIG. 13 is a perspective view showing the magazine in a state in which locking by the lock member has been released.

Thereafter, as shown in FIG. 13, the tape guides 132 of the lock member 130 are slid (moved away from the recording tape T) in the direction of arrow E, which is the opposite direction of the direction of arrow F, along the long hole portions 105B. That is, as shown in FIGS. 9A and 9B, the lock gears 134 of the lock member 130 are removed from the engagement gears 124 of the rotational position defining members 120 to release the lock on the rotation of the rotational position defining members 120. Then, the lock member 130 is removed from the upper cartridge 104.

On the other hand, in a case in which the reinforcement portions 18 and 28 of the reel hubs 12 and 22 are disposed on the rotating members 64, the shaft portions 62 of the rotating members 64 are inserted into the hole portions 30A of the reinforcement portions 18 and 28 (the small cylinder portions 30), and the radial direction positions of the reel hubs 12 and 22 (the reinforcement portions 18 and 28) with respect to the rotating members 64 are precisely positioned (centered). Additionally, the plural (same number as the screw boss portions 66) convex portions 68 of the rotating members 64 become fitted together with the plural (same number as the screw hole portions 40) concave portions 48 formed in the reinforcement portions 18 and 28 of the reel hubs 12 and 22.

Consequently, the circumferential direction positions (angles of rotation) of the reel hubs 12 and 22 (the reinforcement portions 18 and 28) with respect to the rotating members 64 are precisely positioned, and the positions of the boss portions 41 (the screw hole portions 40) of the reinforcement portions 18 and 28 of the reel hubs 12 and 22 and the positions of the screw boss portions 66 of the rotating members 64 are aligned. At this time, the reels 10 and 20 may also be slightly rotated (the circumferential direction positions of the reels 10 and 20 may be adjusted) by manually rotating the rotational position defining members 120 to guide the convex portions 68 to fit together with the concave portions 48.

That is, in a case in which the lock member 130 is removed from the upper cartridge 104, the recording tape T becomes a little slack because the tape guides 132 are disposed further on the side in the direction away from the recording and playback head 70 (the side in the direction of arrow F) than the tape guides 72 of the drive device 60. For this reason, the rotational position defining members 120 can be rotated a little. Moreover, because the engagement gears 124 are formed on the outer peripheral portions of the rotational position defining members 120, in the case of using fingers to rotate the rotational position defining members 120, it is difficult for fingers to slip and easy to rotate the rotational position defining members 120.

Further, even in a case where the convex portions 68 have been successfully fitted together with the concave portions 48 without rotating the reels 10 and 20 a little, the recording tape T is a little slack as mentioned above, so the reels 10 and 20 are rotated a little to put the recording tape T along the tape guides 72. Because of this, the recording tape T guided to the tape guides 132 can be smoothly transferred to the tape guides 72 (the recording tape T can be easily passed in the case of incorporating the reels 10 and 20 into the drive device 60).

Figure 11A:
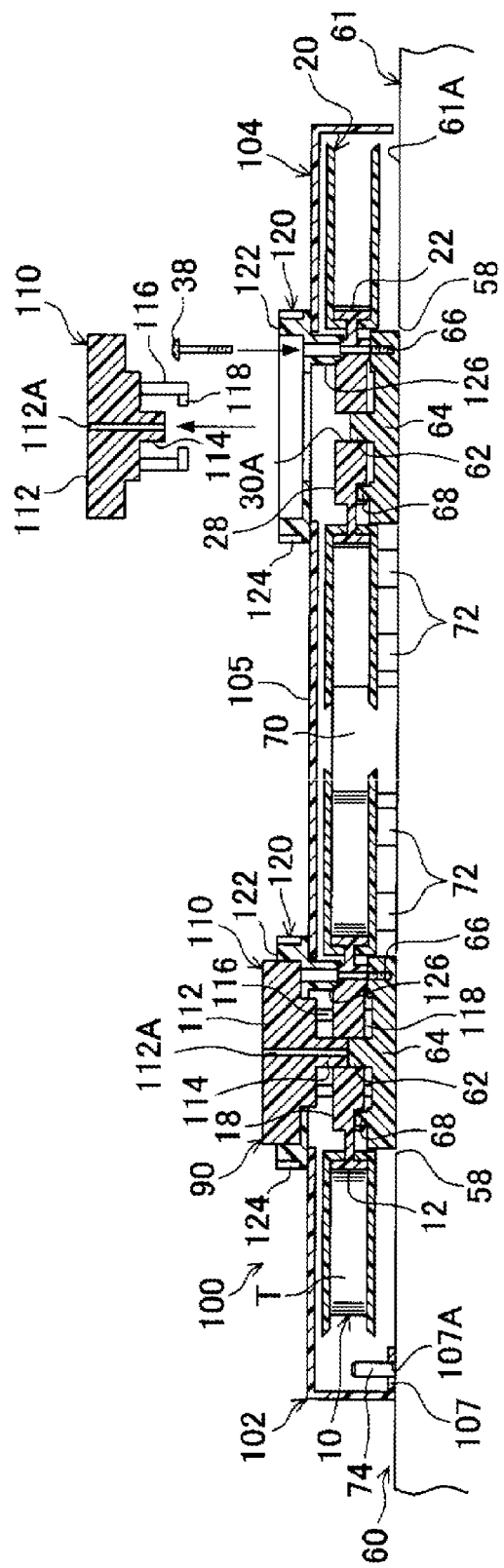
FIG. 11A is an explanatory drawing showing a step of incorporating the magazine into the drive device until removing an upper cartridge.

Once the positions of the reinforcement portions 18 and 28 of the reel hubs 12 and 22 with respect to the rotating members 64 have been defined in this way, the up-and-down position defining members 110 are rotated in the opposite direction of the direction of arrow R to release the catching of the hook portions 118 with respect to the coupling portions 45, and as shown in FIG. 11A, the up-and-down position defining members 110 are removed from the upper cartridge 104 (the rotational position defining members 120).

Figure 14:
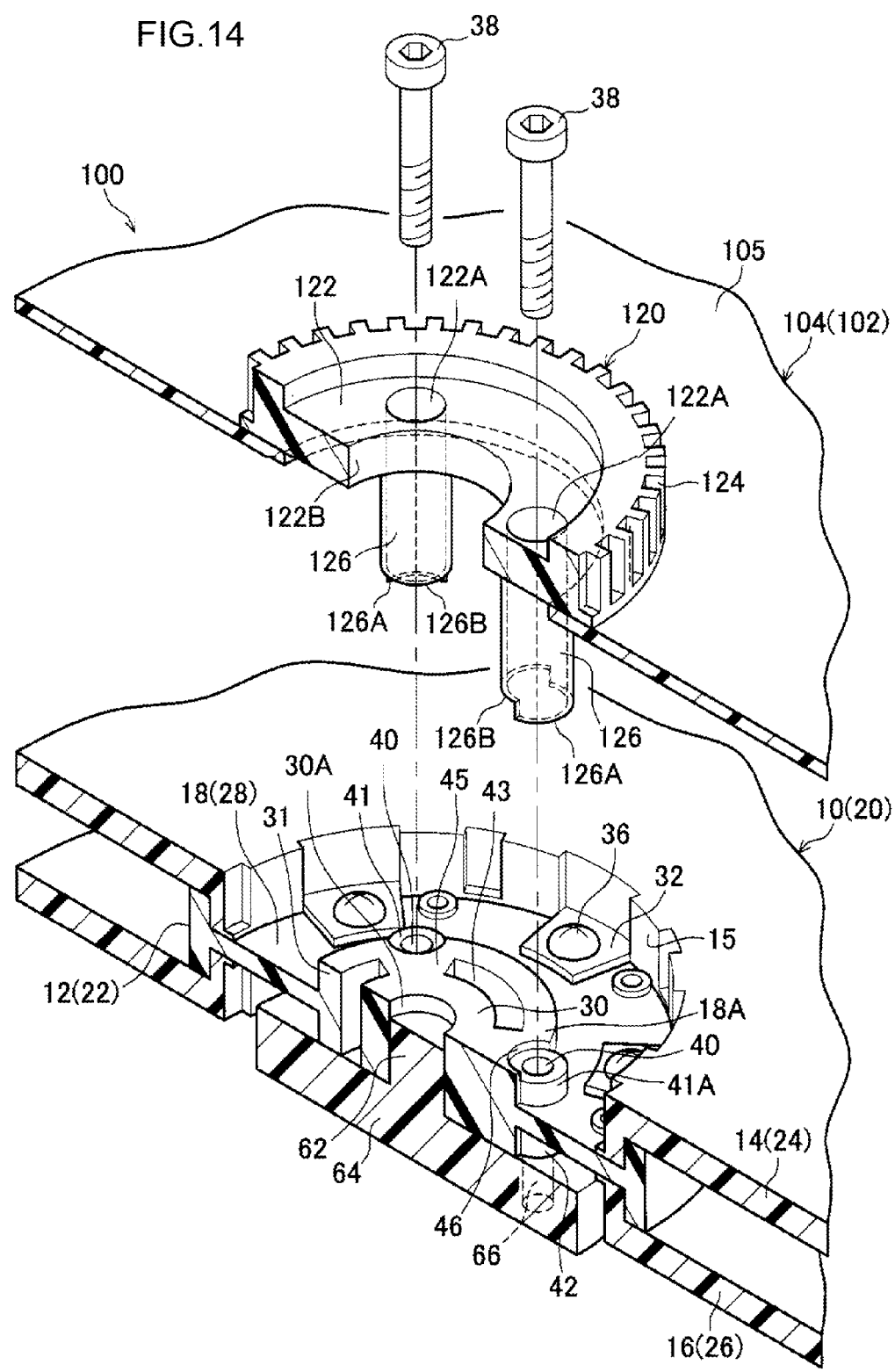
FIG. 14 is an exploded perspective view showing the rotational position defining member equipped with a guide tube portions that guide screws for attaching the reel to the rotating member.
Figure 15:
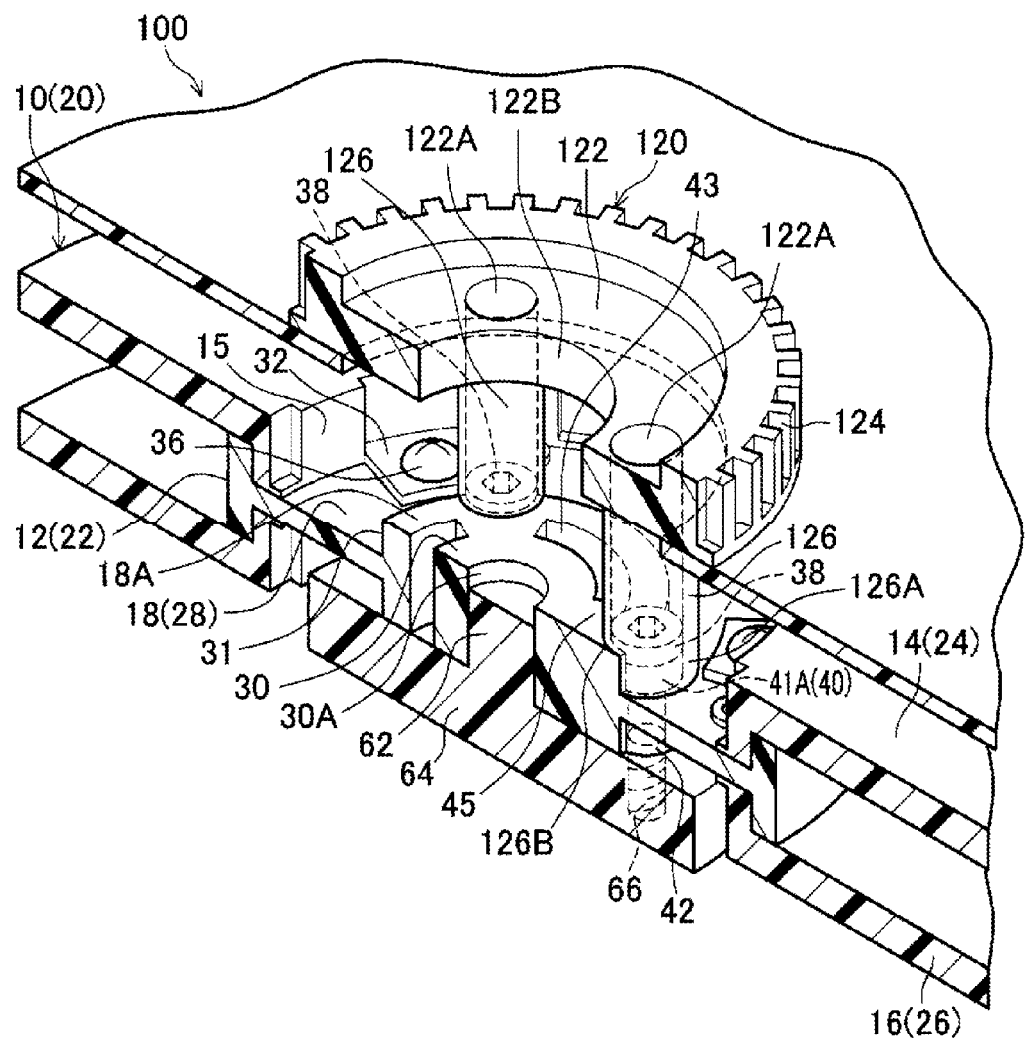
FIG. 15 is a perspective view showing a state in which the reel has been attached to the rotating member by the screws guided by the guide tube portions of the rotational position defining member.

Then, as shown in FIG. 14 and FIG. 15, the screws 38 are inserted into the guide hole portions 122A of the rotational position defining members 120 (a supplying step), whereby the screws 38 are inserted through the screw hole portions 40 of the boss portions 41, and next, a tool not shown in the drawings is inserted into the guide hole portions 122A to screw the screws 38 into the screw boss portions 66 (a screwing step).

That is, at this time, the guide hole portions 122A and the screw hole portions 40 are in communication (aligned) with one another because the boss portions 41 (the screw hole portions 40) disposed on the reinforcement portions 18 and 28 of the reels 10 and 20 and the screw boss portions 66 of the rotating members 64 are in communication (aligned) with one another and the extension portions 126A of the guide tube portions 126 of the rotational position defining members 120 are fitted together with the outer peripheral surfaces 41A of the boss portions 41.

Consequently, the screws 38 can be inserted through the screw hole portions 40 of the boss portions 41 reliably and easily by inserting the screws 38 into the guide hole portions 122A of the guide tube portions 126, and the screws 38 can be screwed into the screw boss portions 66.

Because of this, the reinforcement portion 18 of the reel hub 12 can be fixed to the one rotating member 64, and the reinforcement portion 28 of the reel hub 22 can be fixed to the other rotating member 64. The shape of the reel-fixing screws 38 may be the shape shown in FIG. 11A or the shape shown in FIG. 14 and FIG. 15.

Further, at this time, the height (axial) direction positions of the reels 10 and 20 (the reinforcement portions 18 and 28 of the reel hubs 12 and 22) are precisely positioned and fixed with respect to the rotating members 64 because the projecting portions 42 formed on the lower surfaces of the reinforcement portions 18 and 28 of the reel hubs 12 and 22 come into contact with the upper surfaces of the rotating members 64.

Once the reinforcement portions 18 and 28 of the reels 10 and 20 have been fixed to the rotating members 64 in this way, as shown in FIG. 11B, the rotational position defining members 120 and the upper cartridge 104 are removed from the inside of the casing 61 (on the bottom panel 61A) of the drive device 60 (a removing step). The upper cartridge 104 may also be removed from the inside of the casing 61 (on the bottom panel 61A) after the rotational position defining members 120 have been removed from the upper cartridge 104.

Figure 16:
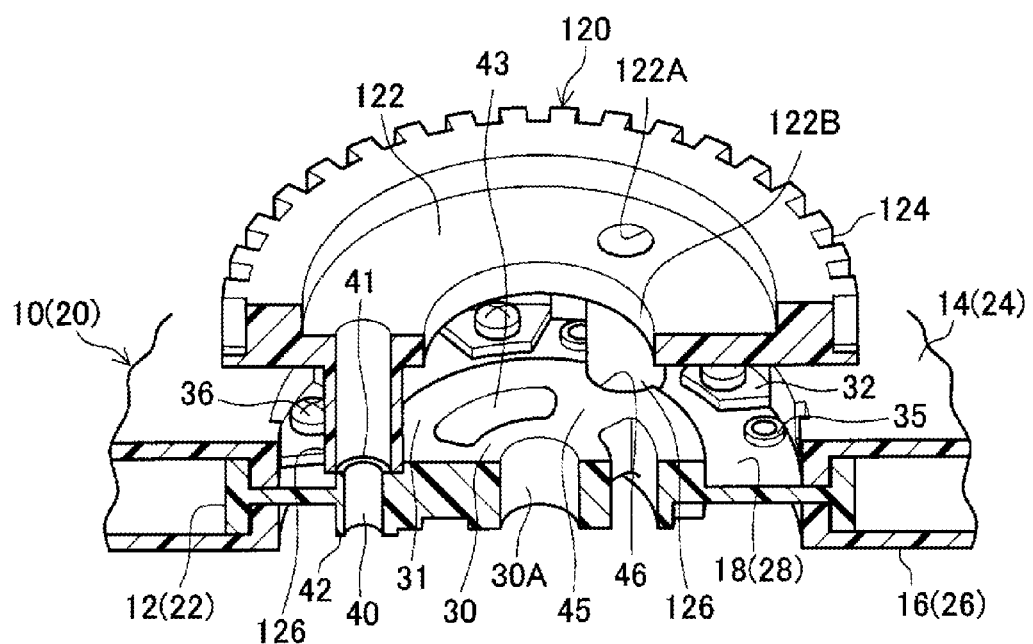
FIG. 16 is a perspective cross-sectional view showing a first modification of the rotational position defining member equipped with the guide tube portions that guide the screws for attaching the reel to the rotating member.
Figure 17:
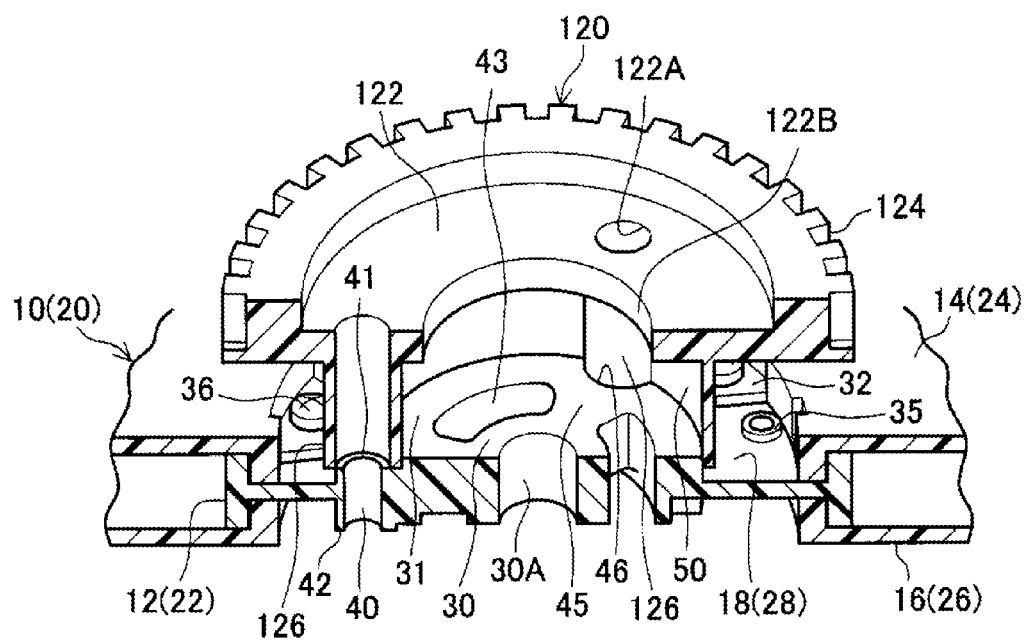
FIG. 17 is a perspective cross-sectional view showing a second modification of the rotational position defining member equipped with the guide tube portions that guide the screws for attaching the reel to the rotating member.
Figure 18:
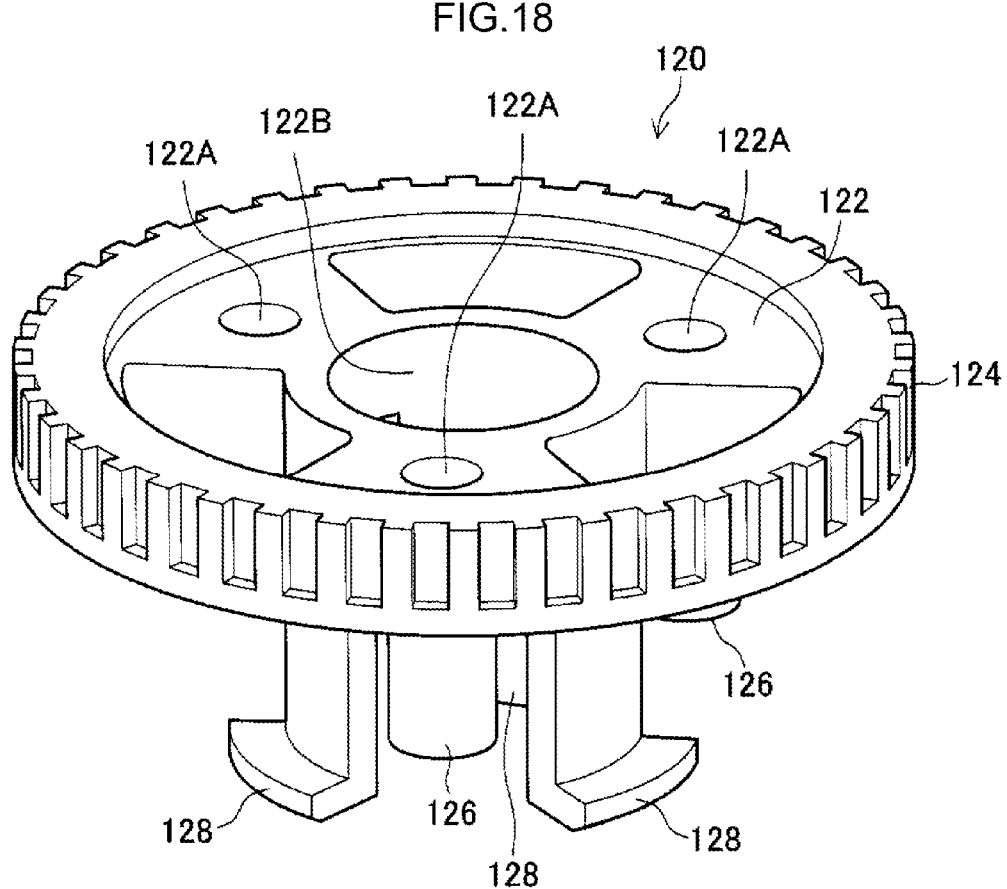
FIG. 18 is a perspective view showing, as seen from above, a third modification of the rotational position defining member equipped with the guide tube portions that guide the screws for attaching the reel to the rotating member.
Figure 19:
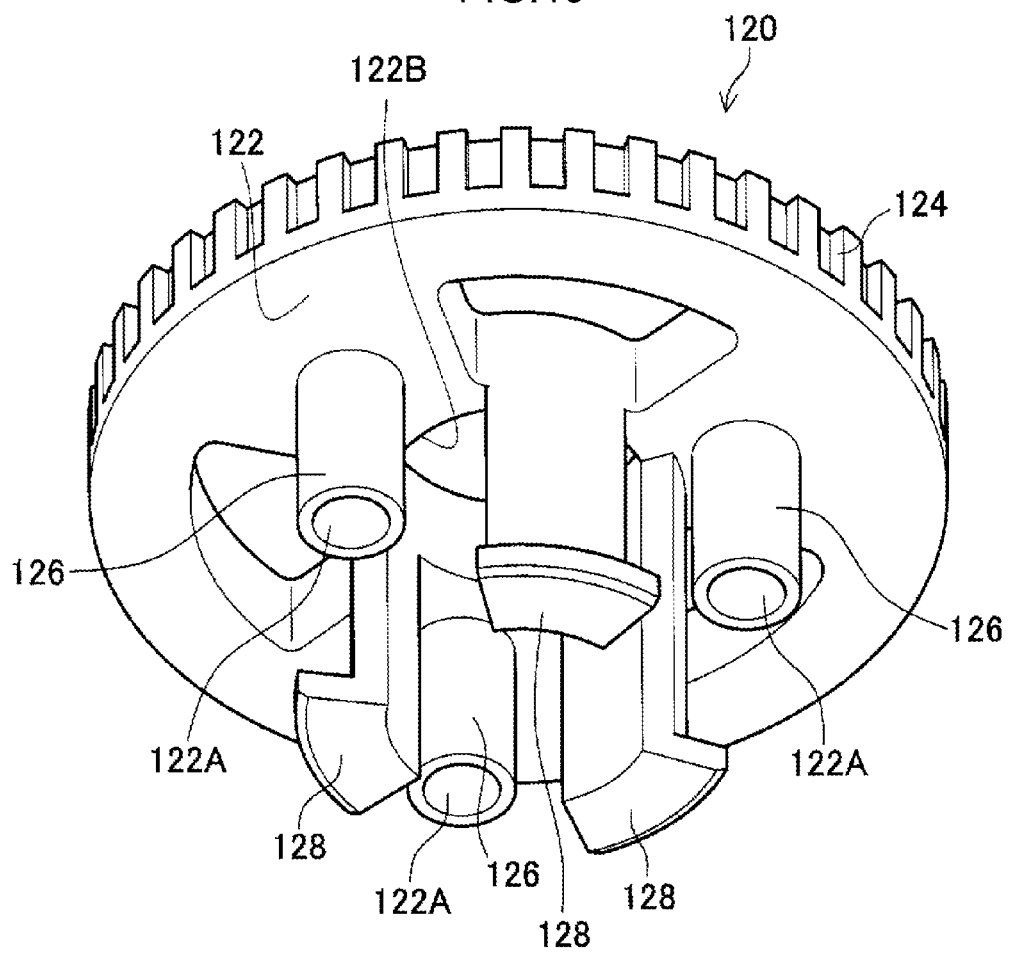
FIG. 19 is a perspective view showing, as seen from below, the third modification of the rotational position defining member equipped with the guide tube portions that guide the screws for attaching the reel to the rotating member.
Figure 20:
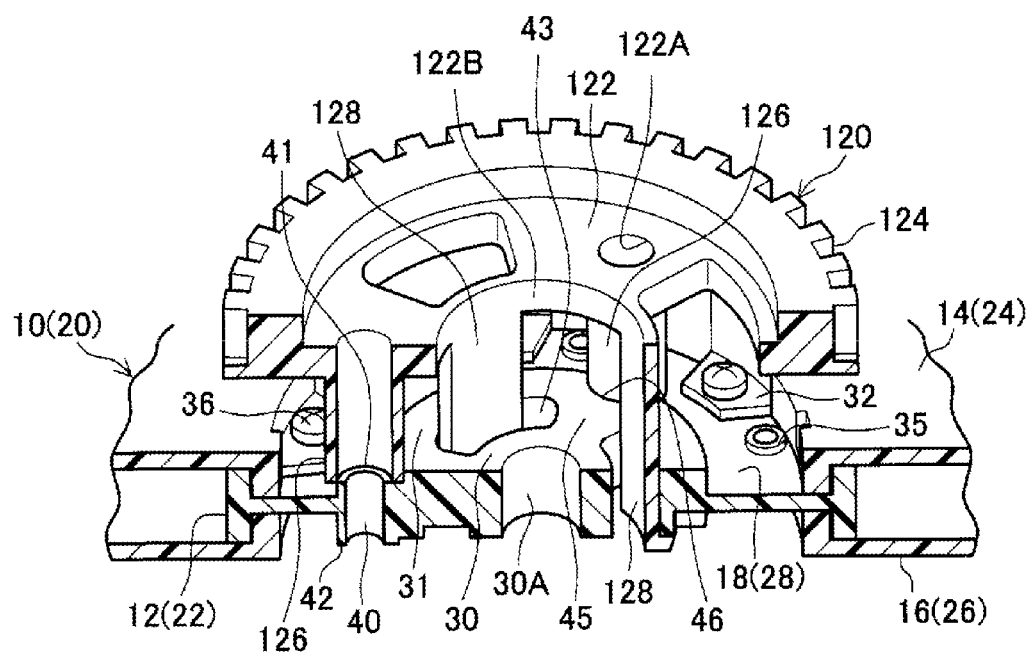
FIG. 20 is a perspective cross-sectional view showing the third modification of the rotational position defining member equipped with the guide tube portions that guide the screws for attaching the reel to the rotating member.

The rotational position defining members 120 pertaining to the present embodiment have the configuration described above, but the shape of the rotational position defining members 120 is not limited to the shape shown in FIG. 5, FIG. 14, and FIG. 15, and the rotational position defining members 120 may also be given the shapes shown in FIG. 16 and FIG. 17 for example (in FIG. 16 and FIG. 17, the upper cartridge 104 is omitted).

That is, as shown in FIG. 16 for example, the rotational position defining members 120 may also be given a configuration where the extension portions 126A are not formed on the lower end portions of the guide tube portions 126 and where the radial direction inside sections of the lower end portions of the guide tube portions 126 are fitted together with circular arc-shaped cutout wall surfaces 46 (see also FIG. 14) serving as fitting counterpart portions disposed in the outer peripheral portions of the large cylinder portions 31 of the reinforcement portions 18 and 28 by forming the boss portions 41.

Further, as shown in FIG. 17 for example, the rotational position defining members 120 may also be given a configuration where circular arc-shaped wall portions 50 that integrally couple the guide tube portions 126 to one another and have an inner diameter capable of fitting together with the outer peripheral surfaces of the large cylinder portions 31 are integrally formed on the lower surfaces of the main body portions 122 of the rotational position defining members 120, the radial direction inside sections of the lower end portions of the guide tube portions 126 are fitted together with the cutout wall surfaces 46, and the inner peripheral surfaces of the circular arc-shaped wall portions 50 are fitted together with the outer peripheral surfaces (fitting counterpart portions) of the large cylinder portions 31.

Figure 21:
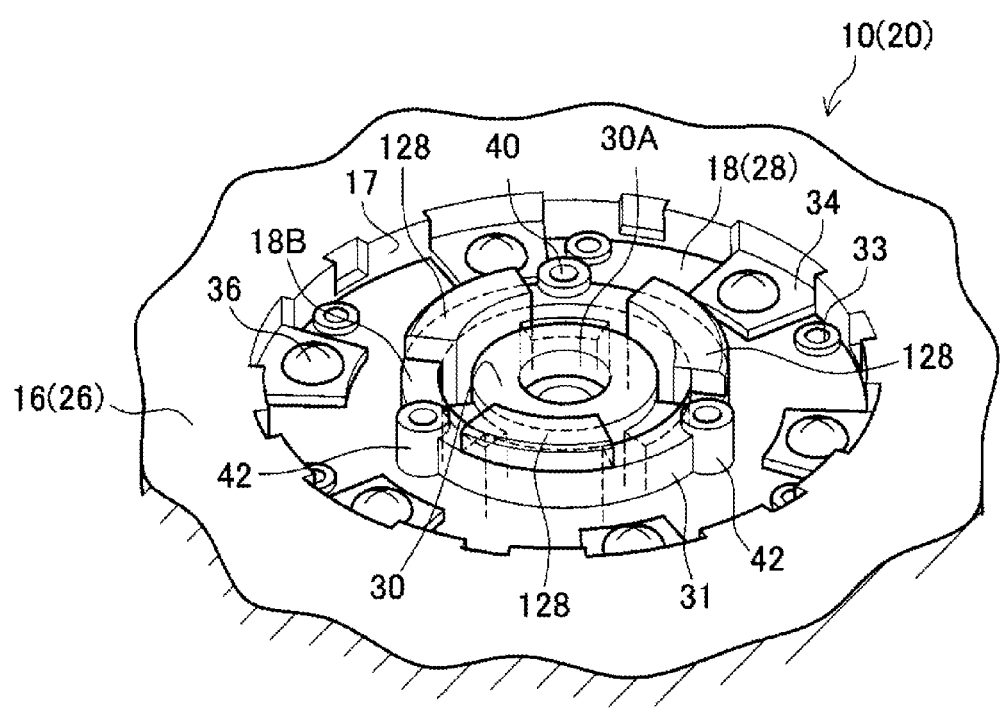
FIG. 21 is a perspective view showing an attachment structure of the rotational position defining member pertaining to the third embodiment.

Further, the rotational position defining members 120 may also be given the shapes shown in FIG. 18 to FIG. 21 for example. That is, the rotational position defining members 120 may also be given a configuration where claw portions 128 serving as catch portions that extend downward are integrally (that is, three at equally-spaced intervals) formed on the lower surfaces of the main body portions 122 of the rotational position defining members 120 midway between the guide tube portions 126, the claw portions 128 are inserted through the long hole portions 43 formed in the reinforcement portions 18 and 28 and, as shown in FIG. 21, are caused to catch on the annular lower surface portions 18B.

In a case in which the rotational position defining members 120 are given this configuration, the reinforcement portions 18 and 28 can be sandwiched and held in the up-and-down direction between the lower end portions of the guide tube portions 126 and the claw portions 128, so the reels 10 and 20 can be held directly even without using the up-and-down position defining members 110. Consequently, in this case, the reels 10 and 20 can be directly incorporated into the drive device 60 by using fingers or a gripping mechanism to grip the outer peripheral portions of the main body portions 122 of the rotational position defining members 120.

It is preferred from the standpoint of preventing slipping that the engagement gears 124 (gear shapes) be formed on the outer peripheral portions of the main body portions 122, but it is also alright if the engagement gears 124 are not formed. Further, after the reels 10 and 20 have been incorporated into the drive device 60 by the rotational position defining members 120, it suffices to insert attachment jigs (not shown in the drawings) into gaps formed between the bottom panel 61A of the casing 61 and the reels 10 and 20 to remove the rotational position defining members 120 from the reels 10 and 20 while releasing the catching of the claw portions 128 with respect to the annular lower surface portions 18B.

In any event, according to the rotational position defining members 120 pertaining to the present embodiment, the screws 38 for fastening the reinforcement portions 18 and 28 of the reel hubs 12 and 22 to the rotating members 64 of the drive device 60 can be reliably and easily guided to the boss portions 41 (the screw hole portions 40) and the screw boss portions 66. Consequently, the rotational position defining members 120 are superior for the incorporability of the pair of reels 10 and 20. Moreover, the rotational position defining members 120 are also good for the environment because they are reusable.

A fastening aid (the rotational position defining members 120), a fastening method, and a reel assembly (the reels 10 and 20 equipped with the rotational position defining members 120) pertaining to the present embodiment have been described above on the basis of the drawings, but the fastening aid, the fastening method, and the reel assembly pertaining to the present embodiment are not limited to those shown in the drawings and are capable of design changes as appropriate without departing from the gist of the present invention.

Further, in the magazine 100, the lower cartridge 106 is not limited to a configuration where it is completely removed from the upper cartridge 104 and may also be given a configuration where it is slid and stored inside the upper cartridge 104. Further, the tape guides 132 serving as provisional guides are not limited to a configuration where cylindrical tape guides are plurally disposed and may also be given a configuration where, for example, wall-like (tabular) tape guides formed in the shapes of substantially circular arcs as seen in a plan view are plurally disposed.

Moreover, the concave portions 48 may be formed in the rotating members 64 and the convex portions 68 may be formed on the reinforcement portions 18 and 28 of the reel hubs 12 and 22 to perform positioning in the circumferential direction (to align the positions of the screw holes portions 40 and the screw boss portions 66). The numerical quantities of the concave portions 48 (the convex portions 68) and the screw hole portions 40 (the screw boss portions 66) are also not limited to three.

Further, the projecting portions 42 are not limited to being formed on the lower surfaces of the screw hole portions 40 and coaxially therewith and may also be formed on a concentric circumference differing from that of the screw hole portions 40 of the lower surfaces of the reinforcement portions 18 and 28. Further, the engaged portions are not limited to the reference holes 107A shown in the drawings, and the engaging portions are also not limited to the positioning pins 74 shown in the drawings. Further, the reels 10 and 20 may also be housed (held) inside the magazine 100 in a state in which recording tape T is wound around each of them and the recording tapes T are not connected.

What is claimed is:

1. A reel assembly, comprising:
   a reel comprising a reel hub having recording tape wound around its outer peripheral surface and having one of either a plurality of convex portions or a plurality of concave portions formed on a lower surface side of the reel hub, the one of either the plurality of convex portions or the plurality of concave portions being configured to be fit together with the other of either the plurality of convex portions or the plurality of concave portions, the other of either the plurality of convex portions or the plurality of concave portions being formed on an upper surface side of a rotating member of a drive device, and the reel further comprising screw hole portions that are configured to be aligned with screw boss portions of the rotating member, by causing the plurality of convex portions and the plurality of concave portions to fit together; and
   a fastening aid comprising:
      a main body portion;
      guide tube portions that are disposed projecting from a lower surface of the main body portion in such a way as to be coaxial with a plurality of guide hole portions formed in the main body portion and to guide screws to screw hole portions formed in the reel hub; and
      fitting portions that are formed on lower end portions of the guide tube portions and are fitted together with fitting counterpart portions formed around the screw hole portions on an upper surface side of the reel hub,
      wherein the fastening aid is configured to be removed from the reel after the reel hub is fastened to the rotating member of the drive device, and
      wherein the fastening aid rotatably holds the reel as a result of the fitting portions being caused to fit together with the fitting counterpart portions.

2. A fastening aid to be used in the case of incorporating a reel, equipped with a reel hub having recording tape wound around its outer peripheral surface, into a drive device and using screws to fasten the reel hub to a rotating member of the drive device, the fastening aid comprising:
   a main body portion;
   guide tube portions that are disposed projecting from a lower surface of the main body portion so as to be coaxial with a plurality of guide hole portions formed in the main body portion and to guide the screws to screw hole portions formed in the reel hub; and
   fitting portions that are formed on lower end portions of the guide tube portions and are fitted together with fitting counterpart portions formed around the screw hole portions on an upper surface side of the reel hub,
   wherein the fastening aid is configured to be removed from the reel after the reel hub is fastened to the rotating member of the drive device,
   wherein the fastening aid rotatably holds the reel as a result of the fitting portions being caused to fit together with the fitting counterpart portions, and
   wherein catch portions are formed on the main body portion, the catch portions being configured to be inserted through through holes formed in the reel hub and catch on a lower surface of the reel hub.

* * * * *